United States Patent
Li

(10) Patent No.: US 11,728,864 B2
(45) Date of Patent: Aug. 15, 2023

(54) CHANNEL STATE INFORMATION FEEDBACK METHOD AND APPARATUS IN WIRELESS COMMUNICATIONS SYSTEM

(71) Applicant: Huawei Technologies Co., Ltd., Shenzhen (CN)

(72) Inventor: Yanchun Li, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/925,989

(22) Filed: Jul. 10, 2020

(65) Prior Publication Data
US 2020/0343960 A1 Oct. 29, 2020

Related U.S. Application Data

(63) Continuation of application No. PCT/CN2019/071150, filed on Jan. 10, 2019.

(30) Foreign Application Priority Data

Jan. 12, 2018 (CN) .......................... 201810032246.5

(51) Int. Cl.
*H04B 7/06* (2006.01)
*H04B 17/336* (2015.01)
(Continued)

(52) U.S. Cl.
CPC ......... *H04B 7/0626* (2013.01); *H04B 7/0417* (2013.01); *H04B 7/0634* (2013.01);
(Continued)

(58) Field of Classification Search
CPC .. H04B 7/0626; H04B 17/336; H04B 7/0417; H04B 7/0634; H04L 1/1614; H04W 24/10; H04W 72/0453
See application file for complete search history.

(56) References Cited

U.S. PATENT DOCUMENTS

| 8,428,168 B1 | 4/2013 | Zhang et al. |
| 10,454,640 B2 * | 10/2019 | Wang .................. H04B 7/0626 |

(Continued)

FOREIGN PATENT DOCUMENTS

| CN | 1780173 A | 5/2006 |
| CN | 1946001 A | 4/2007 |

(Continued)

OTHER PUBLICATIONS

IEEE P802.11ax /D2.0, Draft Standard for Information Technology—Telecommunication and Information Exchange Between Systems Local and Metropolitan Area Networks—Specific Requirements Part 11: Wireless LAN Medium Access Control (MAC) and Physical Layer (PHY) Specifications Amendment 6: Enhancements for High Efficiency WLAN, Oct. 2017, 596 pages.

(Continued)

*Primary Examiner* — Deepa Belur
(74) *Attorney, Agent, or Firm* — Slater Matsil, LLP

(57) ABSTRACT

A channel state information transmission method, where a responder receives a channel measurement signal sent by an initiator by using one or more transmit antennas, and the responder sends a feedback frame to the initiator based on the channel measurement signal. The feedback frame includes information used to indicate a transmit antenna subset of the initiator and one or more channel state information blocks of a channel between the corresponding transmit antenna subset of the initiator and the responder, where the transmit antenna subset is determined from one or more transmit antennas by using which a channel measurement signal is sent.

22 Claims, 16 Drawing Sheets

(51) Int. Cl.
  *H04B 7/0417* (2017.01)
  *H04L 1/1607* (2023.01)
  *H04W 24/10* (2009.01)
  *H04W 72/0453* (2023.01)
(52) U.S. Cl.
  CPC ......... *H04B 17/336* (2015.01); *H04L 1/1614* (2013.01); *H04W 24/10* (2013.01); *H04W 72/0453* (2013.01)

(56) References Cited

U.S. PATENT DOCUMENTS

| | | | |
|---|---|---|---|
| 10,567,134 B1* | 2/2020 | Schelstraete | H04B 7/0417 |
| 11,317,306 B2* | 4/2022 | Wei | H04B 7/0626 |
| 2009/0290563 A1* | 11/2009 | Gu | H04B 7/0691 375/267 |
| 2012/0213113 A1* | 8/2012 | Zhao | H04B 7/024 370/252 |
| 2014/0286267 A1 | 9/2014 | Hui et al. | |
| 2016/0065350 A1* | 3/2016 | Suzuki | H04L 5/0051 370/329 |
| 2016/0080052 A1 | 3/2016 | Li et al. | |
| 2016/0143055 A1* | 5/2016 | Nammi | H04W 74/04 370/329 |
| 2017/0164226 A1* | 6/2017 | Wei | H04B 7/0478 |
| 2017/0317727 A1 | 11/2017 | Wang et al. | |
| 2019/0123800 A1* | 4/2019 | Takeda | H04W 72/12 |
| 2019/0140730 A1* | 5/2019 | Oteri | H04B 7/0417 |
| 2019/0149306 A1* | 5/2019 | Gao | H04L 5/0023 370/252 |
| 2019/0319682 A1* | 10/2019 | Zhang | H04B 7/0626 |
| 2020/0304190 A1* | 9/2020 | Na | H04B 7/0695 |
| 2021/0028831 A1* | 1/2021 | Lou | H04B 7/0417 |

FOREIGN PATENT DOCUMENTS

| | | |
|---|---|---|
| CN | 101114862 A | 1/2008 |
| CN | 101606339 A | 12/2009 |
| CN | 102098084 A | 6/2011 |
| CN | 104184562 A | 12/2014 |
| CN | 104716998 A | 6/2015 |
| CN | 105917594 A | 8/2016 |
| CN | 106301490 A | 1/2017 |
| CN | 107466461 A | 12/2017 |

OTHER PUBLICATIONS

"IEEE Standard for Information technology—Telecommunications and information exchange between systems Local and metropolitan area networks-Specific requirements, Part 11: Wireless LAN Medium Access Control (MAC) and Physical Layer (PHY) Specifications," IEEE Std 802.11-2016, 3534 pages.

"IEEE P802.11ay/D0.35, May 2017, Draft Standard for Information Technology Telecommunications and Information Exchange Between Systems Local and Metropolitan Area Networks Specific Requirements Part 11: Wireless LAN Medium Access Control (MAC) and Physical Layer(PHY) Specifications," Amendment 7: Enhanced throughput for operation in license-exempt bands above 45 GHz, May 2017, 256 pages.

* cited by examiner

| Field | | Meaning |
|---|---|---|
| SNR | SNR_1 | Signal-to-noise ratio of a spatial stream 1 in a spatial stream subset |
| | SNR_2 | Signal-to-noise ratio of a spatial stream 2 in a spatial stream subset |
| | ... | ... |
| | SNR_Ns | Signal-to-noise ratio of a spatial stream Ns in a spatial stream subset |
| Angle coefficient based on a Givens method | Angle value 1 | Including the angle value 1 obtained by performing the Givens method on a channel matrix |
| | Angle value 2 | Including the angle value 2 obtained by performing the Givens method on a channel matrix |
| | ... | ... |
| | Angle value Na | Including the angle value Na obtained by performing the Givens method on a channel matrix |

FIG. 11a

| Field | | Meaning |
|---|---|---|
| SNR | SNR_1 | Signal-to-noise ratio of a spatial stream 1 in a spatial stream subset |
| | SNR_2 | Signal-to-noise ratio of a spatial stream 2 in a spatial stream subset |
| | ... | ... |
| | SNR_Ns | Signal-to-noise ratio of a spatial stream Ns in a spatial stream subset |
| Channel coefficient of a CSI channel matrix | Element 1 | Real part and imaginary part corresponding to the element 1 in a channel matrix |
| | Element 2 | Real part and imaginary part corresponding to the element 2 in a channel matrix |
| | ... | ... |
| | Element N | Real part and imaginary part corresponding to the element N in a channel matrix |

FIG. 11b

| Field | | Meaning |
|---|---|---|
| SNR | SNR_1 | Signal-to-noise ratio of a receive antenna 1 |
| | SNR_2 | Signal-to-noise ratio of a receive antenna 2 |
| | ... | ... |
| | SNR_Nr | Signal-to-noise ratio of a receive antenna Nr |
| Channel coefficient of a CSI channel matrix | Element 1 | Real part and imaginary part corresponding to the element 1 in a channel matrix |
| | Element 2 | Real part and imaginary part corresponding to the element 2 in a channel matrix |
| | ... | ... |
| | Element N | Real part and imaginary part corresponding to the element N in a channel matrix |

FIG. 11c

| Order (Order) | Information (Information) |
|---|---|
| 1 | Frame Category (Category) |
| 2 | Unprotected DMG action field (Unprotected DMG action field) |
| 3 | Dialog token (Dialog token) |
| 4 | MIMO feedback control (MIMO feedback control element) field |
| 5 | One or more channel measurement feedback elements (One or more channel measurement feedback elements) |
| 6 | One or more EDMG channel measurement feedback elements (One or more EDMG channel measurement feedback elements) |
| 7 | One or more frequency channel measurement feedback elements (One or more frequency channel measurement feedback elements) |

FIG. 12

| 1301 | 1302 | 1303 | 1304 | 1305 | 1306 | 1307 | 1308 |
|---|---|---|---|---|---|---|---|
| Number of combinations of transmit sectors (Number of TX sector combinations present) | Frequency-domain channel measurement feedback field identifier (Frequency channel measurement present) | Transmission configuration subset identifier (Sector ID order/TX antenna mask present) | Ng | Number of rows | Number of columns | Codebook Information (Codebook information) | Single-user/multi-user type (SU/MU type) |
| a | 1 | 1 | b | 3 | 3 | c | 1 |

Bits (bits)

FIG. 13

| Order (Order) | Information (Information) |
|---|---|
| 1 | Frame Category (Category) |
| 2 | Unprotected DMG action field (Unprotected DMG action field) |
| 3 | Dialog token (Dialog token) |
| 4 | MIMO feedback control (MIMO feedback control element) field |
| 5 | One or more channel measurement feedback elements (One or more channel measurement feedback elements) |
| 6 | One or more EDMG channel feedback elements (One or more EDMG channel measurement feedback elements) |

FIG. 14

| Order (Order) | Information (Information) |
|---|---|
| 1 | Frame Category (Category) |
| 2 | Unprotected DMG action field (Unprotected DMG action field) |
| 3 | Dialog token (Dialog token) |
| 4 | MIMO feedback control (MIMO feedback control element) field |
| 5 | One or more channel measurement feedback elements (One or more channel measurement feedback elements) |
| 6 | One or more frequency channel measurement feedback elements (One or more frequency channel measurement feedback elements) |

FIG. 15

CHANNEL STATE INFORMATION FEEDBACK METHOD AND APPARATUS IN WIRELESS COMMUNICATIONS SYSTEM

CROSS-REFERENCE TO RELATED APPLICATIONS

This application is a continuation of International Application No. PCT/CN2019/071150, filed on Jan. 10, 2019, which claims priority to Chinese Patent Application No. 201810032246.5, filed on Jan. 12, 2018. The disclosures of the aforementioned applications are incorporated herein by reference in their entireties.

TECHNICAL FIELD

This application relates to the wireless communications field, and in particular, to a channel state information feedback technology in a wireless communications system.

BACKGROUND

Beamforming is a method in which two or more communication parties implement a necessary transmission link budget for a subsequent communication process. In other words, a transmitted signal and/or a received signal is/are concentrated in a beam direction pointing to a receiver and/or a transmitter to enhance the signal, so that quality of the communication signal is improved.

In an existing 802.11ay enhanced directional multi-gigabit (EDMG) multiple-input multiple-output (MIMO) beamforming training protocol procedure, two-phase protocols: an analog MIMO beamforming protocol and a digital MIMO beamforming protocol are generally included. In a digital (or hybrid) beamforming feedback phase in an existing protocol, a time-domain feedback manner is used. A feedback frame includes a time-domain channel coefficient, and specifically includes delay information of one or more taps, and an amplitude and a phase shift corresponding to the one or more taps, a real part or an imaginary part corresponding to one or more taps.

When there are a large quantity of channel taps, feedback information includes delay information of the large quantity of taps and information about amplitudes and phase shifts corresponding to the large quantity of taps, and therefore feedback overheads are relatively high.

SUMMARY

To resolve the foregoing problem, this application provides a method and an apparatus for reducing channel state information feedback overheads in a wireless communications system, to reduce feedback overheads.

According to a first aspect, an embodiment of the present invention provides a channel state information feedback method. The method includes: generating, by a responder, a feedback frame, where the feedback frame includes information used to indicate a transmit antenna subset of an initiator and one or more channel state information blocks that represent channel state information between the transmit antenna subset of the initiator and one or more receive antennas of the responder, where the transmit antenna subset of the initiator is determined from one or more transmit antennas of the initiator, and sending, by the responder, the feedback frame. According to the solution provided in this embodiment of the present invention, the responder may feed back channel state information corresponding to some of the transmit antennas. This reduces feedback overheads.

According to a second aspect, an embodiment of the present invention provides a channel state information receiving method. The method includes: receiving, by an initiator, a feedback frame, where the feedback frame includes information used to indicate a transmit antenna subset of the initiator and one or more channel state information blocks that represent channel state information between the transmit antenna subset of the initiator and one or more receive antennas of the responder, where the transmit antenna subset of the initiator is determined from one or more transmit antennas of the initiator, and obtaining, based on the information used to indicate the transmit antenna subset of the initiator, the one or more channel state information blocks of a channel between the corresponding transmit antenna subset of the initiator and the one or more receive antennas of the responder. In the solution provided in this embodiment of the present invention, the feedback frame includes only channel state information corresponding to some of the transmit antennas. This reduces feedback overheads.

According to the first aspect or the second aspect, in a possible design, each of the one or more channel state information blocks includes one or more angle values that represent the channel state information, and the one or more angle values are determined by using a Givens method. In this embodiment of the present invention, the feedback frame is further compressed by using the Givens method. This further reduces feedback overheads.

According to the first aspect or the second aspect, in a possible design, that the transmit antenna subset of the initiator is determined from one or more transmit antennas of the initiator is specifically: determining, by the responder, the transmit antenna subset from the one or more transmit antennas of the initiator based on one or more user mask (user mask) fields included in a multiple-input multiple-output spatial configuration frame. According to the method in this embodiment of the present invention, the responder may determine the transmit antenna subset based on the multiple-input multiple-output spatial configuration frame in the analog beamforming phase. This reduces complexity of selecting the transmit antenna subset by the responder.

In an example, the one user mask field is corresponding to one of the one or more transmit antennas of the initiator, one bit in the user mask field is corresponding to one responder, and whether a corresponding transmit antenna is included in the transmit antenna subset is determined based on the user mask field. For example, for a responder 1, a first bit of the user mask field is the corresponding responder 1. When values of four user mask fields corresponding to four transmit antennas (antennas 1, 2, 3, and 4) are respectively 1100, 1010, 0011, and 0101, it is determined that a transmit antenna subset of the responder 1 includes the transmit antenna 1 and the transmit antenna 2.

According to the first aspect and the second aspect, in a possible design, the information used to indicate the transmit antenna subset includes a bitmap, where each bit in the bitmap is corresponding to each one of the one or more transmit antennas and indicates whether each of the one or more transmit antennas is included in the transmit antenna subset. The bitmap of the transmit antenna included in the feedback frame is used to enable the initiator to accurately obtain a transmit antenna corresponding to the channel state information block. This reduces complexity of receiving a compressed feedback frame by the initiator.

According to the first aspect and the second aspect, in a possible design, the information used to indicate the transmit antenna subset includes an antenna ID of each transmit antenna in the transmit antenna subset. An antenna ID of each antenna in the transmit antenna subset included in the feedback frame is used to enable the initiator to accurately obtain a transmit antenna corresponding to the channel state information block.

According to the first aspect and the second aspect, in a possible design, the one or more channel state information blocks are obtained by the responder by measuring one or more channel measurement signals on one or more specific receive beams corresponding to the one or more receive antennas, where the one or more channel measurement signals are sent by the initiator on one or more specific transmit beams corresponding to the one or more transmit antennas. The one or more transmit antennas and/or the one or more specific transmit beams, and the one or more receive antennas and/or the one or more specific receive beams are determined based on the multiple-input multiple-output spatial configuration frame sent by the initiator in the analog beamforming phase. According to this embodiment of the present invention, after analog beamforming training, antenna beams of the initiator and the responder point to each other, crosstalk between some spatial streams is relatively small, and only channel state information corresponding to some of the antennas is fed back. This reduces feedback overheads.

According to the first aspect and the second aspect, in a possible design, the feedback frame further includes one or a combination of the following: a responder receive antenna ID corresponding to the transmit antenna subset, a transmit sector ID or an antenna weight vector AWV number corresponding to the transmit antenna subset, a spatial stream number corresponding to the transmit antenna subset, and a transmit sector CDOWN value corresponding to the transmit antenna subset. The feedback frame includes complete transmission configuration information corresponding to the transmit antenna subset. It can be ensured that the channel state information blocks obtained by the initiator can be correctly in a one-to-one correspondence with transmit and receive antennas, transmit and receive beams, transmit and receive sectors/antenna weight vectors AWV, and the like.

According to a third aspect, an embodiment of the present invention provides still another channel state information feedback method. The method includes: generating, by a responder, a feedback frame, where the feedback frame includes information used to indicate one or more transmit sector subsets and one or more channel state information blocks of a channel between a corresponding transmit sector subset of an initiator and the responder, where the transmit sector subset of the initiator is determined from one or more transmit sectors of the initiator, and sending, by the responder, the feedback frame. According to the solution provided in this embodiment of the present invention, the responder may feed back channel state information corresponding to some of the transmit sectors. This reduces feedback overheads.

According to a fourth aspect, an embodiment of the present invention provides still another channel state information feedback method. The method includes: generating, by a responder, a feedback frame, where the feedback frame includes information used to indicate one or more spatial stream subsets and one or more channel state information blocks of a channel between a corresponding spatial stream subset of an initiator and the responder, where the spatial stream subset of the initiator is determined from one or more spatial streams of the initiator, and sending, by the responder, the feedback frame. According to the solution provided in this embodiment of the present invention, the responder may feed back channel state information corresponding to some of the spatial streams. This reduces feedback overheads.

According to a fifth aspect, an embodiment of the present invention provides a channel state information feedback apparatus. The apparatus has a function of implementing actions of a responder in the foregoing method. The function may be implemented by hardware, or may be implemented by hardware executing response software. The hardware or the software includes one or more modules corresponding to the foregoing function.

In a possible design, the apparatus may include a processor and a transceiver. The processor may be configured to support the responder to perform a corresponding function in the foregoing method. For example, the processor may be configured to generate a feedback frame. The transceiver may be configured to support communication between a responder and an initiator. For example, the transceiver may receive one or more channel measurement signals sent by the initiator, and may further send a feedback frame to the initiator. The apparatus may further include a memory. The memory is configured to be coupled to the processor, and the memory stores a program instruction and data that are necessary for the apparatus to perform the foregoing method.

According to a sixth aspect, an embodiment of the present invention provides a channel state information receiving apparatus. The apparatus has a function of implementing actions of an initiator in the foregoing method. The function may be implemented by hardware, or may be implemented by hardware executing response software. The hardware or the software includes one or more modules corresponding to the foregoing function.

In a possible design, the apparatus includes a processor and a transceiver. The processor may be configured to support an initiator to perform a corresponding function in the foregoing method. For example, the processor may be configured to obtain, based on information used to indicate a transmit antenna subset of the initiator, one or more channel state information blocks of a channel between the corresponding transmit antenna subset of the initiator and a responder. The transceiver may be configured to support communication between the initiator and the responder. For example, the transceiver may be configured to send one or more channel measurement signals to the responder, and may further be configured to receive a feedback frame sent by the responder. The apparatus may further include a memory. The memory is configured to be coupled to the processor, and the memory stores a program instruction and data that are necessary for the apparatus to perform the foregoing method.

According to still another aspect, an embodiment of the present invention provides a channel state information transmission apparatus, applied to a responder. The apparatus includes a processor, and the processor is configured to: be coupled to a memory, read an instruction in the memory, and perform, according to the instruction, the methods in the foregoing aspects related to the responder.

According to still another aspect, an embodiment of the present invention provides a channel state information transmission apparatus, applied to an initiator. The apparatus includes a processor, and the processor is configured to: be coupled to a memory, read an instruction in the memory, and perform, according to the instruction, the methods in the foregoing aspects related to the initiator.

According to still another aspect, an embodiment of the present invention provides a computer-readable storage medium. The computer-readable storage medium stores an instruction for performing the methods in the foregoing aspects related to the responder, and the instruction may be executed by one or more processors in a processing circuit.

According to still another aspect, an embodiment of the present invention provides a computer-readable storage medium. The computer-readable storage medium stores an instruction for performing the methods in the foregoing aspects related to the initiator, and the instruction may be executed by one or more processors in a processing circuit.

According to still another aspect, an embodiment of the present invention provides a computer program product, including program code. When the computer program product runs on a computer, the computer is enabled to perform the methods in the foregoing aspects related to the responder.

According to still another aspect, an embodiment of the present invention provides a computer program product, including program code. When the computer program product runs on a computer, the computer is enabled to perform the methods in the foregoing aspects related to the initiator.

According to still another aspect, an embodiment of the present invention provides a chip system. The chip system includes a processor, configured to support a data sending device to implement functions in the foregoing aspects, for example, generating or processing data and/or information in the foregoing methods. In a possible design, the chip system further includes a memory. The memory is configured to save necessary program instructions and data of a data sending device. The chip system may include a chip, or may include a chip and another discrete component.

Compared with the prior art, in the solution provided in the present invention, the feedback frame includes some channel state information. This reduces feedback overheads and improves feedback efficiency.

BRIEF DESCRIPTION OF THE DRAWINGS

To describe the embodiments of the present invention more clearly, the following briefly describes the accompanying drawings in the embodiments. Obviously, a person of ordinary skill in the art can further obtain other drawings based on these accompanying drawings without creative efforts.

FIG. 11a is a schematic diagram of a data structure of a channel state information block field according to an embodiment of the present invention;

FIG. 11b is a schematic diagram of a data structure of another channel state information block field according to an embodiment of the present invention;

FIG. 11c is a schematic diagram of a data structure of still another channel state information block field according to an embodiment of the present invention;

FIG. 12 is a schematic diagram of a frame structure of a feedback frame according to an embodiment of the present invention;

FIG. 13 is a schematic diagram of a frame structure of another feedback frame according to an embodiment of the present invention;

FIG. 14 is a schematic diagram of a data structure of a feedback type field according to an embodiment of the present invention;

FIG. 15 is a schematic diagram of a frame structure of still another feedback frame according to an embodiment of the present invention;

DETAILED DESCRIPTION OF ILLUSTRATIVE EMBODIMENTS

A scenario described in embodiments of the present invention is intended to describe technical solutions of the embodiments of the present invention more clearly, and does not constitute a limitation to the technical solutions provided in the embodiments of the present invention. It is clear that the described embodiments are merely some rather than all of the embodiments of the present invention. All other embodiments obtained by a person of ordinary skill in the art based on the embodiments of this application without creative efforts shall fall within the protection scope of this application.

Beamforming is a method in which two or more communication parties implement a necessary transmission link budget for a subsequent communication process. In other words, a transmitted signal and/or a received signal is/are concentrated in a beam direction pointing to a receiver and/or a transmitter to enhance the signal, so that quality of the communication signal is improved.

Figure 1:
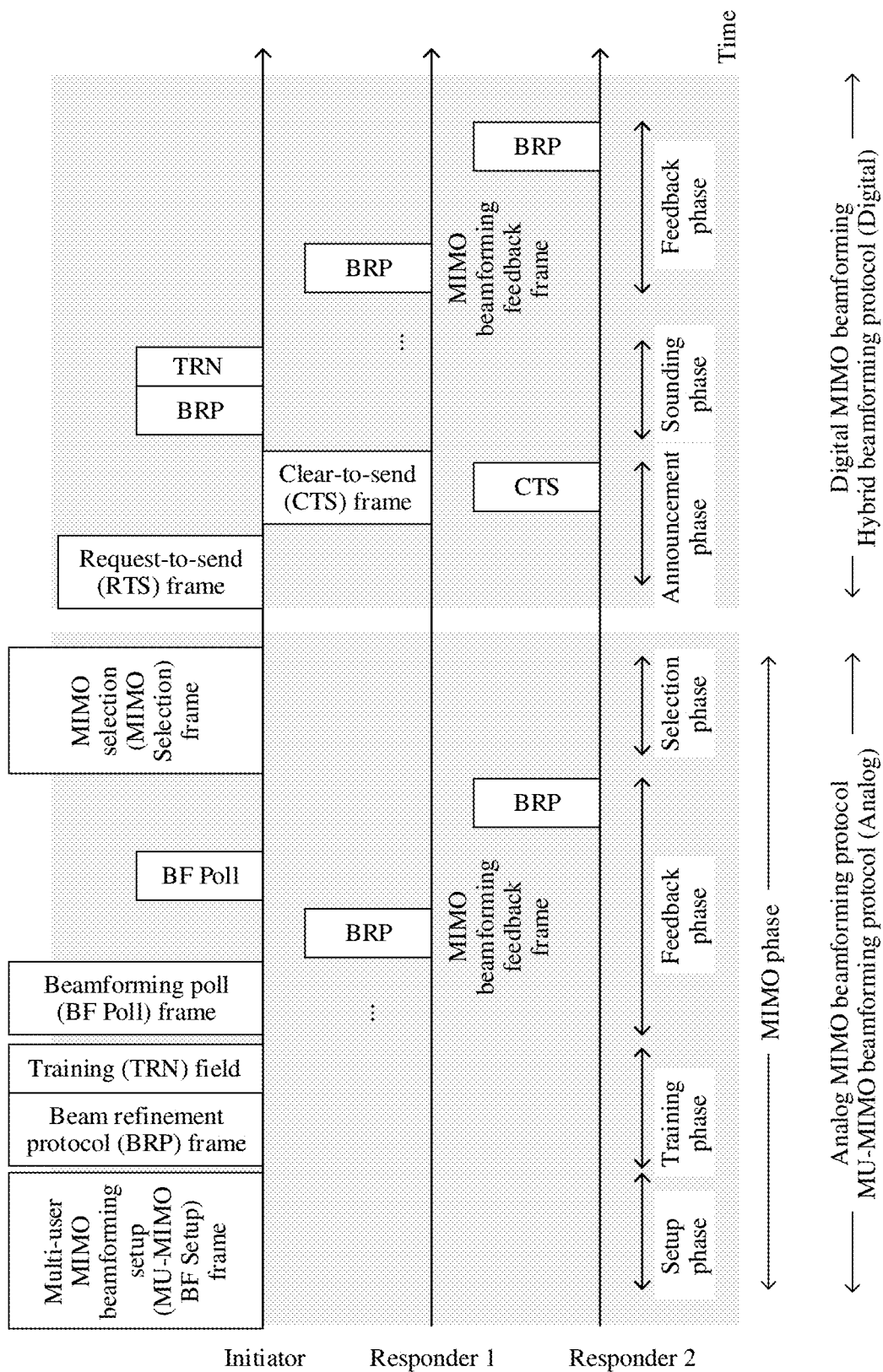
FIG. 1 is a schematic diagram of a time sequence of a MU-MIMO hybrid beamforming process in the 802.11ay protocol.

In an existing 802.11ay enhanced directional multi-gigabit MIMO beamforming training protocol procedure, two-phase protocols: an analog MIMO beamforming protocol and a digital MIMO beamforming protocol are generally included. FIG. 1 is a schematic diagram of a beamforming training procedure.

First, the analog MIMO beamforming protocol is completed, and the analog MIMO beamforming protocol includes four sub-phases: setup, training, feedback, and selection. In the training phase, an initiator may send one or more beam refinement protocol (BRP) frames that each include a beam reference signal (for example, a training (TRN) field and a channel estimation field (CEF)), or an initiator may send a null data packet NDP (NDP) frame for channel measurement between the initiator and one or more responders. In the feedback phase, the responder sends, to the initiator, a feedback frame that includes a signal strength, signal quality, a signal-to-noise ratio (SNR), another beam indicator, or the like of the one or more beam refinement protocol frames or the NDP frame that are/is obtained through measurement. In the selection phase, the initiator receives the feedback frame, and sends a selection frame to the responder, where the selection frame includes one or more MIMO spatial configuration fields.

Further, digital MIMO beamforming, also referred to as hybrid beamforming, is completed based on analog MIMO beamforming. The hybrid beamforming includes three sub-phases: an announcement phase, a sounding phase, and a feedback phase. In the announcement phase, an announcement frame or a declaration frame is used to enable an initiator and a responder to establish a transmission configuration and a receive configuration of beamforming training, so as to notify the two parties of a MIMO spatial configuration that needs to be used in measurement in the next phase. In the sounding phase, the initiator sends a beam refinement protocol frame that includes a beam reference signal (for example, a TRN field or a CEF field), or a null data frame to the responder for channel measurement by one or more responders. In the feedback phase, the responder sends channel state information obtained through measurement in the previous phase to the initiator in a form of a feedback frame, for subsequent hybrid beamforming data transmission.

However, in the feedback phase of digital (or hybrid) beamforming of an existing protocol, when a time-domain feedback manner is used, the channel state information carried in the feedback frame includes a time-domain channel coefficient, that is, delay information of one or more taps, and an amplitude and a phase shift corresponding to one or more taps or a real part or an imaginary part corresponding to one or more taps. When a frequency-domain feedback manner is used, the channel state information carried in the feedback frame includes a frequency-domain channel coefficient corresponding to each sampling frequency, that is, an amplitude and a phase shift of each element in each channel state information matrix or a real part or an imaginary part of each element, where a dimension of the channel state information matrix is determined by a quantity of all transmit antennas and receive antennas that are used when beamforming is performed.

It may be understood that, in the time-domain feedback manner, when there are a large quantity of channel taps, feedback information includes delay information of the large quantity of taps and information about amplitudes and phase shifts corresponding to the large quantity of taps, and therefore feedback overheads are relatively high. However, when the frequency-domain feedback manner is used, when there are a large quantity of transmit antennas of the initiator, feedback information includes a large quantity of frequency-domain channel coefficients, and therefore feedback overheads are relatively high.

Figure 2:
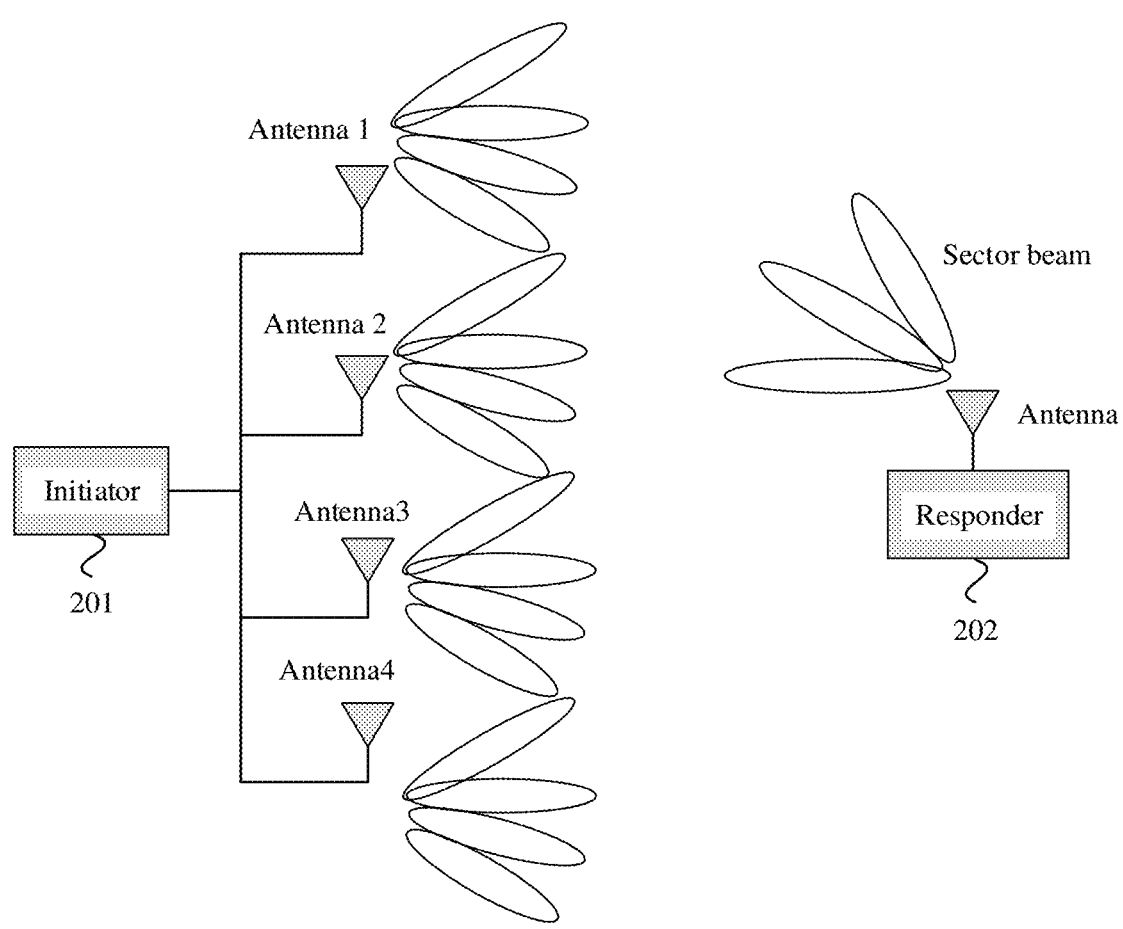
FIG. 2 is a schematic diagram of an application scenario according to an embodiment of the present invention.

FIG. 2 shows an example application scenario according to an embodiment of the present invention. In the application scenario, at least two beamforming apparatuses are included. For ease of description, FIG. 2 shows only two beamforming apparatuses, and the two beamforming apparatuses are an initiator 201 and a responder 202. The initiator 201 may have a digital beamforming capability, the initiator 201 may include a plurality of transmit antennas (for example, antennas 1, 2, 3, and 4), and the responder 202 may include one or more transmit antennas. When the initiator 201 and the responder 202 each include a plurality of antennas, a multiple-input multiple-output MIMO system may be formed.

The initiator 201 and the responder 202 in the embodiments of the present invention may be a base station, an access point (AP), a personal basic service set control point (PCP), or a device that communicates with a wireless terminal over an air interface by using one or more sectors in an access network. For example, the base station may be a base station (BTS) in GSM or CDMA, or may be a base station (NodeB) in WCDMA, or may be an evolved NodeB (evolutional NodeB, eNB or e-NodeB) in LTE. This is not limited in this application.

Certainly, the initiator 201 and the responder 202 in the embodiments of the present invention may be a device that provides a user with voice and/or data connectivity, a handheld device with a wireless connection function, or another processing device connected to a wireless modem. The wireless terminal may be a mobile terminal such as a mobile phone (or also referred to as a "cellular" phone) and a computer that has a mobile terminal, for example may be a portable, pocket-size, handheld, computer-built-in or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may be referred to as a system, a subscriber unit, a subscriber station, a mobile station, a mobile console (Mobile), a remote station, a station (STA), a remote terminal, an access terminal, a user terminal, a user agent, a user device, or user equipment, or the like.

Embodiments of the present invention provide a channel state information transmission method and apparatus. The method includes: generating, by a responder, a feedback frame, where the feedback includes information used to indicate one or more transmit antenna subsets/one or more transmit sector subsets/one or more spatial stream subsets and one or more channel state information blocks of a channel between the corresponding one or more transmit antenna subsets/the corresponding one or more transmit sector subsets/the corresponding one or more spatial stream subsets and the responder, further, sending, by the responder, the feedback frame to the initiator, and after receiving the feedback frame, obtaining, by the initiator, the one or more channel state information blocks of the channel between the corresponding one or more transmit antenna subsets/the corresponding one or more transmit sector subsets/the corresponding one or more spatial stream subsets and the responder. Compared with the prior art in which all channel state information is included in the feedback frame, in the embodiments, the feedback frame includes channel state information corresponding to some of the transmit antenna subsets/the one or more transmit sector subsets/the one or more spatial stream subsets. This reduces feedback overheads. Further, the one or more channel state information blocks may further be compressed by using a Givens method. This further reduces feedback overheads and improves feedback efficiency.

The term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

The following describes the solutions in the embodiments with reference to more accompanying drawings. It should be noted that, in the following embodiments, an initiator may be the initiator 201 and a responder may be the responder 202.

Figure 3:
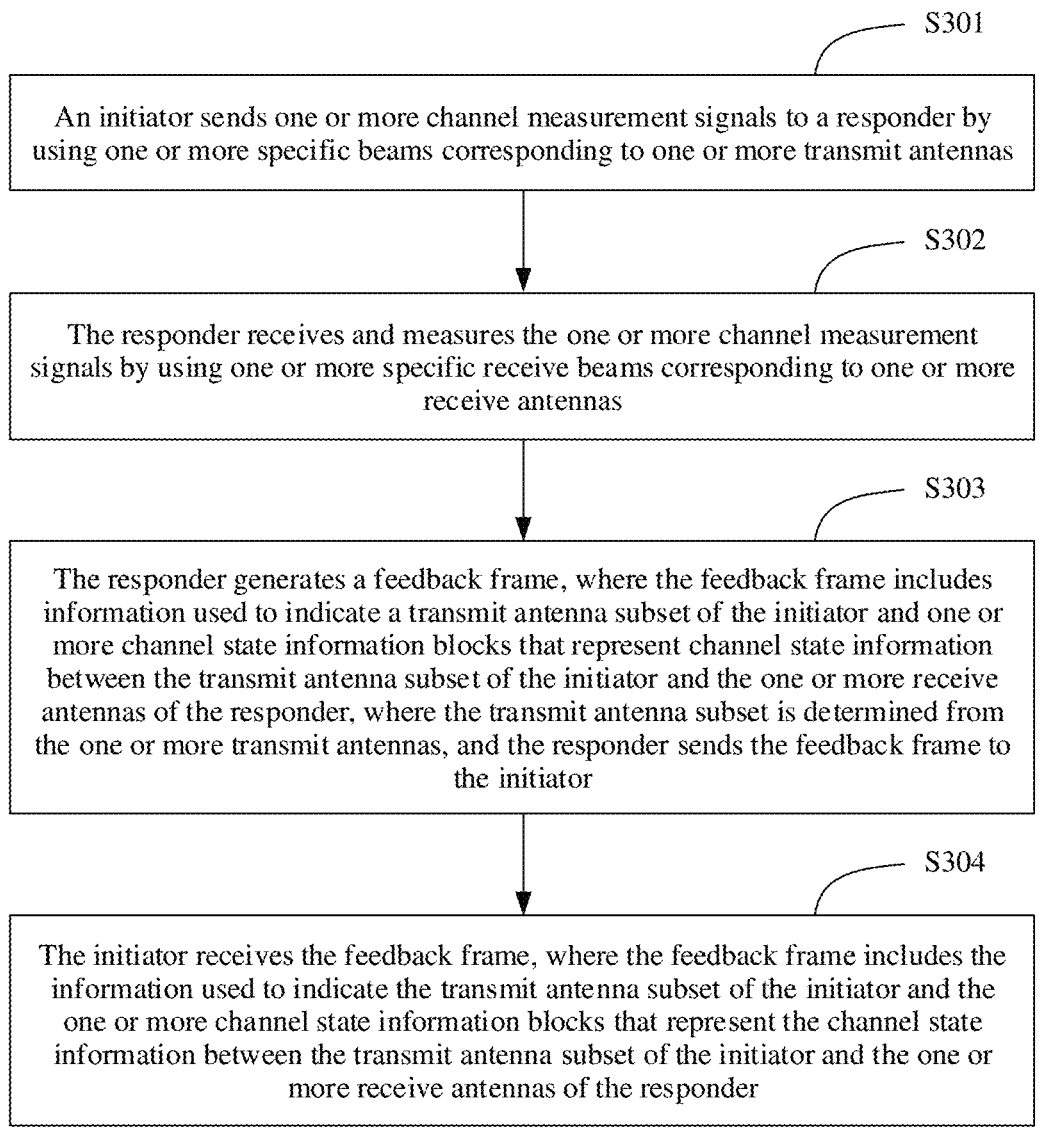
FIG. 3 is a schematic flowchart of a channel state information transmission method according to an embodiment of the present invention.

FIG. 3 is a schematic flowchart of a channel state information transmission method according to an embodiment of the present invention.

S301: An initiator sends one or more channel measurement signals to a responder by using one or more specific beams corresponding to one or more transmit antennas, where the one or more channel measurement signals are used to measure a channel between the initiator and the responder.

In a specific embodiment, the initiator sends the one or more channel measurement signals to the responder. The channel measurement signals may be sequentially or simultaneously sent in time domain. The one or more channel measurement signals are used to measure the channel between the initiator and the responder. In an example, the channel measurement signal may be a beam refinement protocol frame (BRP) that includes a beam reference signal (for example, a TRN field or a CEF field). In another example, the channel measurement signal may alternatively be a null data packet frame NDP frame.

It may be understood that the initiator may send the channel measurement signal to one or more responders.

It should be noted that the one or more channel measurement signals may be sent by a plurality of transmit antennas of one initiator, or may be sent by one or more transmit antennas of a plurality (which means two or more than two) of initiators. In this embodiment, a plurality of transmit antennas and/or a plurality of transmit sectors and/or a plurality of transmit spatial streams of one initiator are used for description. This does not constitute a limitation on this embodiment.

S302: The responder receives and measures the one or more channel measurement signals by using one or more specific receive beams corresponding to one or more receive antennas, where the one or more channel measurement signals are used to measure the channel between the initiator and the responder.

The responder receives the one or more channel measurement signals, measures, based on the one or more channel measurement signals, a channel between the corresponding one or more transmit antennas and the responder, and obtains channel state information of the channel between the one or more transmit antennas and the responder. Specifically, one or more channel state information blocks are channel state information obtained by the responder by measuring the one or more channel measurement signals in a specific transmit or receive beam state of antennas of the initiator and the responder.

In one example, the one or more transmit antennas and the one or more receive antennas may be determined by using one or more antenna configuration fields included in a multi-input multi-output spatial configuration frame sent by the initiator in an analog beam forming phase. In the selection sub-phase of the analog beamforming phase, antenna beams of the initiator and the responder point to each other, and crosstalk between some spatial streams is relatively small. The initiator may send the multiple-input multiple-output spatial configuration frame to the responder. The spatial configuration frame may include one or more antenna configuration fields, where the one or more antenna configuration fields include an antenna ID of one or more transmit antennas, an antenna ID of one or more receive antennas of the responder, one or more transmit beam number IDs corresponding to the one or more transmit antennas, and one or more receive beam numbers corresponding to the one or more receive antennas. The initiator and the responder may determine, based on the spatial configuration frame, a digital beamforming phase, antenna IDs of the one or more transmit antennas that are used by the initiator to send the one or more channel measurement signals, and one or more specific transmit beams corresponding to the transmit antennas. The initiator and the responder may further determine one or more receive antenna IDs of the one or more channel measurement signals received by the responder and one or more specific receive beams corresponding to the receive antennas.

In another example, before the initiator sends the channel measurement signal, the initiator sends transmission and receiving configuration information used for beamforming. For example, the initiator notifies the responder, by using a control frame, of an ID of one or more transmit antennas that need to be used to send the channel measurement signal and a specific transmit beam corresponding to the ID, and further notifies the responder of an ID of one or more receive antennas that need to be used to receive the channel measurement signal and a specific receive beam corresponding to the ID.

S303: The responder generates a feedback frame, where the feedback frame includes information used to indicate a transmit antenna subset of the initiator and one or more channel state information blocks that represent channel state information between the transmit antenna subset of the initiator and the one or more receive antennas of the responder, and the responder sends the feedback frame to the initiator.

In an example, the information used to indicate the transmit antenna subset of the initiator may be a bitmap, where each bit is corresponding to whether each of the one or more transmit antennas by using which the channel measurement signal is sent is included in the transmit antenna subset. For example, the initiator uses four transmit antennas: an antenna 1, an antenna 2, an antenna 3, and an antenna 4 to send the channel measurement signal, and therefore corresponding bits include four bits. A first bit may be corresponding to the antenna 1, a second bit may be corresponding to the antenna 2, and a third bit may be corresponding to the antenna 3, and a fourth bit may be corresponding to the antenna 4. When a value of the first bit is 1, it may indicate that the antenna 1 is included in the transmit antenna subset. For example, when the bitmap is 1100, it indicates that the transmit antenna subset includes the transmit antenna 1 and the transmit antenna 2.

In another example, the information used to indicate the transmit antenna subset of the initiator may be a number identifier (ID) of each antenna in the transmit antenna subset. For example, when the transmit antenna subset includes the transmit antenna 1 and the transmit antenna 2, the transmit antenna subset may include an ID of the antenna 1 and an ID of the antenna 2.

In still another example, the information used to indicate the transmit antenna subset of the initiator may further include an antenna ID of each antenna in the transmit antenna subset, a number ID of one or more transmit sectors corresponding to the transmit antenna subset, and a CDOWN value corresponding to the one or more sectors, and a number ID of a receive antenna corresponding to one or more transmit antennas. For example, when the initiator sends one or more channel measurement signals by using transmit antennas 1, 2, 3, and 4, the transmit antenna subset includes the transmit antenna 1 and the transmit antenna 2, corresponding transmit sectors are sector 1 and sector 2, and corresponding spatial stream numbers are 1 and 2. When corresponding responder receive antennas are a receive antenna 1 and a receive antenna 2, in addition to number IDs of the transmit antenna 1 and the transmit antenna 2, the feedback frame may further include numbers of the transmit sector 1 and the transmit sector 2 and number information of the spatial stream 1 and the spatial stream 2, and may further include CDOWN values corresponding to the sector 1 and the sector 2 and numbers of the receive antenna 1 and the receive antenna 2 of the responder.

It should be noted that one transmit antenna in this embodiment of this application may be one logical transmit antenna, that is, a plurality of antennas jointly send one channel measurement signal, or may be a physical antenna.

The feedback frame further includes the one or more channel state information blocks of the channel between the corresponding transmit antenna subset of the initiator and the responder, and the channel state information block is channel state information obtained by the responder by receiving and measuring the one or more channel measurement signals by using a specific receive beam corresponding to the one or more receive antennas. In addition, the channel state information block may be fed back in frequency domain, or may be fed back in time domain.

In an example, the one or more channel state information blocks may be fed back in frequency domain, each channel state information block may include a frequency-domain channel coefficient corresponding to one sampling frequency, and the frequency-domain channel coefficient may include an amplitude value and a phase shift of each element in a channel state information matrix corresponding to the sampling frequency, or may be a real part and an imaginary part of each element in a channel state information matrix. The channel state information block may alternatively include one or more angle values that represent the channel state information. The one or more angle values are determined after the channel state information matrix corresponding to the sampling frequency is processed by using a Givens method. Specifically, the Givens method is described in section 19.3.12.3.6 compressed beamforming feedback matrix of the IEEE 802.11 standard, and may be understood by a person skilled in the art. For example, when the initiator sends one or more channel sounding information by using four transmit antennas (transmit antennas 1, 2, 3, and 4), the responder receives the one or more channel measurement signals by using two antennas (receive antennas 1 and 2), and a transmission configuration subset includes the transmit antenna 1 and the transmit antenna 2, the feedback frame may include one or more channel state information blocks corresponding to the transmit antennas 1 and 2 and the receive antennas 1 and 2, where each channel state information block has two angle values.

In another example, the one or more channel state information blocks may be fed back in time domain, and the channel state information block may include a delay corresponding to one or more taps, and an amplitude and a phase shift corresponding to the delay or a real part and an imaginary part corresponding to the delay. Optionally, an overall signal-to-noise ratio (SNR) may further be used.

When the feedback frame includes a plurality (two or more than two) of channel state information blocks, the feedback frame may further include a number identifier of the channel state information blocks, and the number identifier is used to indicate a number of channel state information blocks included in the feedback frame.

The feedback frame further includes but is not limited to one or a combination of the following: a feedback frame type identifier, used to indicate a type of the feedback frame. For example, one bit is used to identify the feedback frame type. When a value of the identifier of the feedback frame is 1, it may indicate that the feedback frame type is frequency-domain feedback, and when a value of the identifier of the feedback frame is 0, it may indicate that the feedback frame type is time-domain feedback. In an example, the feedback frame type identifier may be included in a frame type field, or may be included in an element type field in the feedback frame, or may be included in a sub-element type field. The frame type field may be a multiple-input multiple-output beam feedback frame type (MIMO BF feedback frame), a beam refinement protocol (BRP) frame type, or another frame type, a down-sampling rate Ng, used to indicate a down-sampling rate of the feedback frame, a number Nc of columns, used to indicate a number of columns of a channel state information matrix corresponding to the one or more channel state information blocks, a measurement dialog identifier, used to indicate a dialog in which the channel measurement signal corresponding to the feedback frame is located, to indicate a dialog token field or a dialog time of a channel measurement signal corresponding to the channel state information block included in the feedback frame. It may be uniquely determined that the feedback is a feedback of which channel measurement signal sent by the initiator, a signal strength or a signal-to-noise ratio SNR, used to indicate a signal strength or a signal-to-noise ratio SNR of each column in the channel state information matrix, a channel state information feedback type identifier, used to indicate whether the one or more channel state information blocks use a channel time-domain coefficient or a frequency-domain coefficient, a feedback compression type identifier, used to indicate that the one or more channel state information blocks use a frequency-domain compressed coefficient matrix or a frequency-domain non-compressed coefficient matrix, a codebook information field, used to indicate a number of quantization bits corresponding to a preset quantization mode used for a value in the one or more channel state information blocks, and a measurement channel frequency-domain identifier corresponding to the feedback, used to indicate channel bandwidth or a frequency-domain resource block corresponding to the one or more channel state information blocks. In an example, when the initiator uses a channel bonding technology, the identifier may be used to indicate bandwidth of a channel. For example, if the initiator sends the channel measurement signal on a plurality of bonded 2.16 GHz channels for measurement, the initiator needs to feed back a beamforming matrix on a sampling frequency corresponding to the plurality of 2.16 GHz channels, and the identifier may be used to indicate the bandwidth of the channel. Alternatively, when the initiator sends the one or more channel measurement signals by using one or more time-frequency resources, the identifier may be used to indicate corresponding resource block information. For example, the responder feeds back a beamforming matrix on a sampling frequency corresponding to an orthogonal frequency-division multiple access (OFDMA) resource block on the 2.16 GHz channel, where the identifier indicates the OFDMA resource block.

S304: The initiator receives the feedback frame, where the feedback frame includes the information used to indicate the transmit antenna subset of the initiator and the one or more channel state information blocks that represent the channel state information between the transmit antenna subset of the initiator and the one or more receive antennas of the responder.

The initiator determines, based on the information used to indicate the transmit antenna subset of the initiator, that the responder does not feed back channel state information of channels corresponding to all transmit antennas. Further, the initiator obtains the one or more channel state information blocks that are included in the feedback frame and that are of the channel between the corresponding transmit antenna subset of the initiator and the responder. For example, when the initiator sends the one or more channel measurement signals by using the transmit antennas 1, 2, 3, and 4, the initiator receives the feedback frame, determines information that the transmit antenna subset includes the transmit antenna 1 and the transmit antenna 2, and obtains one or more channel state information blocks of a channel between the corresponding transmit antenna 1 and the responder and a channel between the transmit antenna 2 and the responder.

Compared with the prior art in which all the transmit antennas and the channel state information corresponding to all the transmit antennas are included in the feedback frame, in this embodiment of the present invention, the feedback frame includes the transmit antenna subset and the channel state information corresponding to the transmit antenna subset. This reduces feedback overheads and improves feedback efficiency.

Figure 4:
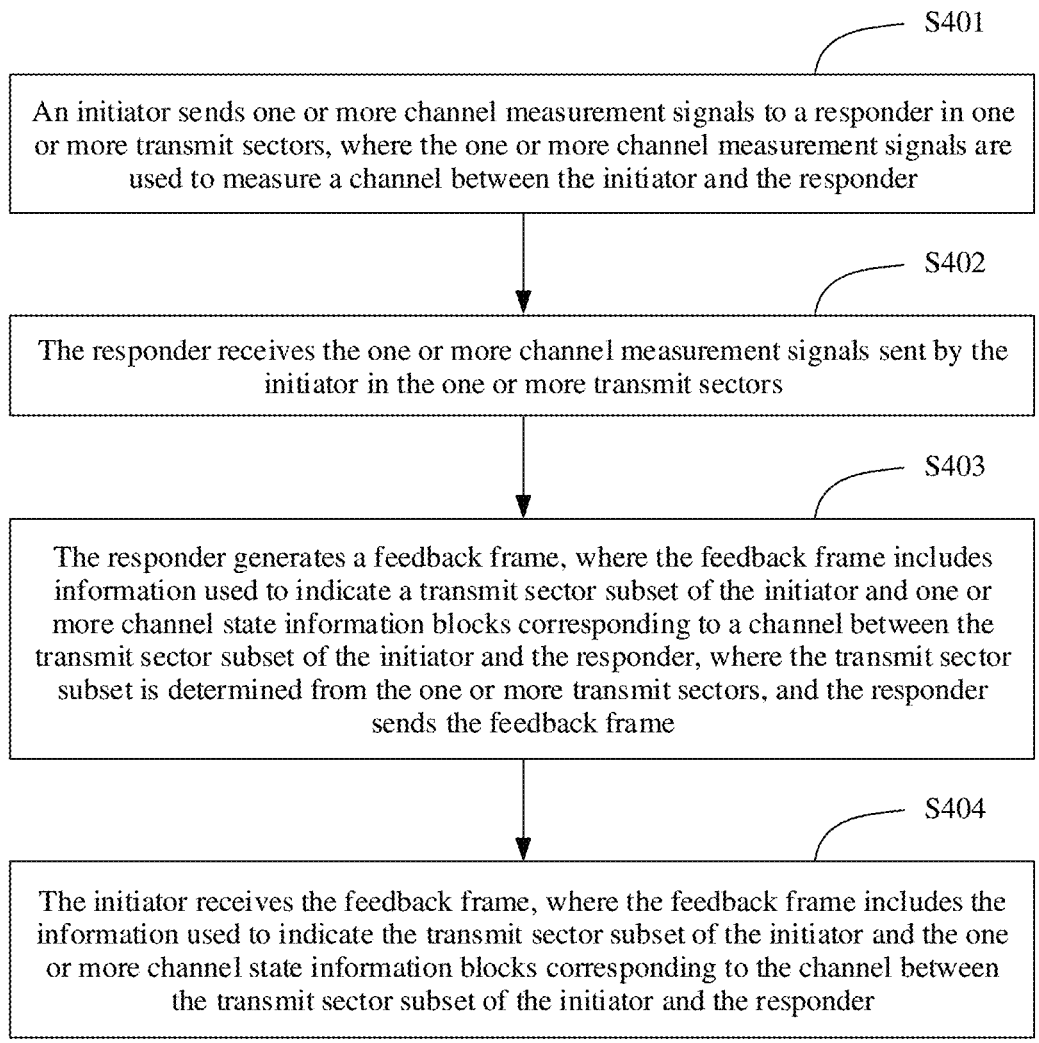
FIG. 4 is a schematic flowchart of another channel state information transmission method according to an embodiment of the present invention.

FIG. 4 is a schematic flowchart of another channel state information transmission method according to an embodiment of the present invention.

S401: An initiator sends one or more channel measurement signals to a responder in one or more transmit sectors, where the one or more channel measurement signals are used to measure a channel between the initiator and the responder.

Step S401 is similar to the step S301. The initiator sends the one or more channel measurement signals to the responder in the one or more transmit sectors, where the one or more transmit sectors may be corresponding to one or more transmit antennas of the initiator. Similarly, the one or more transmit sectors may come from one initiator, or may come from a plurality of initiators.

S402: The responder receives the one or more channel measurement signals sent by the initiator in the one or more transmit sectors, where the one or more channel measurement signals are used to measure the channel between the initiator and the responder.

The responder receives the one or more channel measurement signals, measures, based on the one or more channel measurement signals, a channel between the one or more transmit sectors and the responder, and obtains channel state information of the channel between the one or more transmit sectors and the responder.

S403: The responder generates a feedback frame, where the feedback frame includes information used to indicate a transmit sector subset of the initiator and one or more channel state information blocks of a channel between the corresponding transmit sector subset of the initiator and the responder, where the transmit sector subset of the initiator is determined from the one or more transmit sectors, and the responder sends the feedback frame.

The transmit sector subset is a subset of the one or more transmit sectors in which the one or more channel measurement signals are sent. In other words, the transmit sector subset is determined from the one or more transmit sectors in which the one or more channel measurement signals are sent.

In an optional manner, the information used to indicate the transmit sector subset of the initiator may be a bitmap, where each bitmap is corresponding to whether each of the one or more transmit sectors in which the one or more channel measurement signals are sent is included in the transmit sector subset.

In another optional manner, the information used to indicate the transmit sector subset of the initiator may be a number ID of each sector in the transmit sector subset.

The one or more channel state information blocks are similar to those in the step S303. Details are not described herein again.

Optionally, the feedback frame further includes but is not limited to one or a combination of the following: a feedback frame type identifier, a down-sampling rate Ng, a number Nc of columns, a measurement dialog identifier, a signal strength or a signal-to-noise ratio SNR, a channel state information feedback type identifier, a feedback compression type identifier, a codebook information field, and a measurement channel frequency-domain identifier corresponding to the feedback. The specific functions of the fields are similar to those in the step S303. Details are not repeated here.

S404: The initiator receives the feedback frame, where the feedback frame includes the information used to indicate the transmit sector subset of the initiator and the one or more channel state information blocks of the channel between the corresponding transmit sector subset of the initiator and the responder.

Compared with the prior art in which all channel state information is included in the feedback frame, in this embodiment of the present invention, the feedback frame includes the transmit sector subset and the channel state information corresponding to the transmit sector subset. This reduces feedback overheads and improves feedback efficiency.

Figure 5:
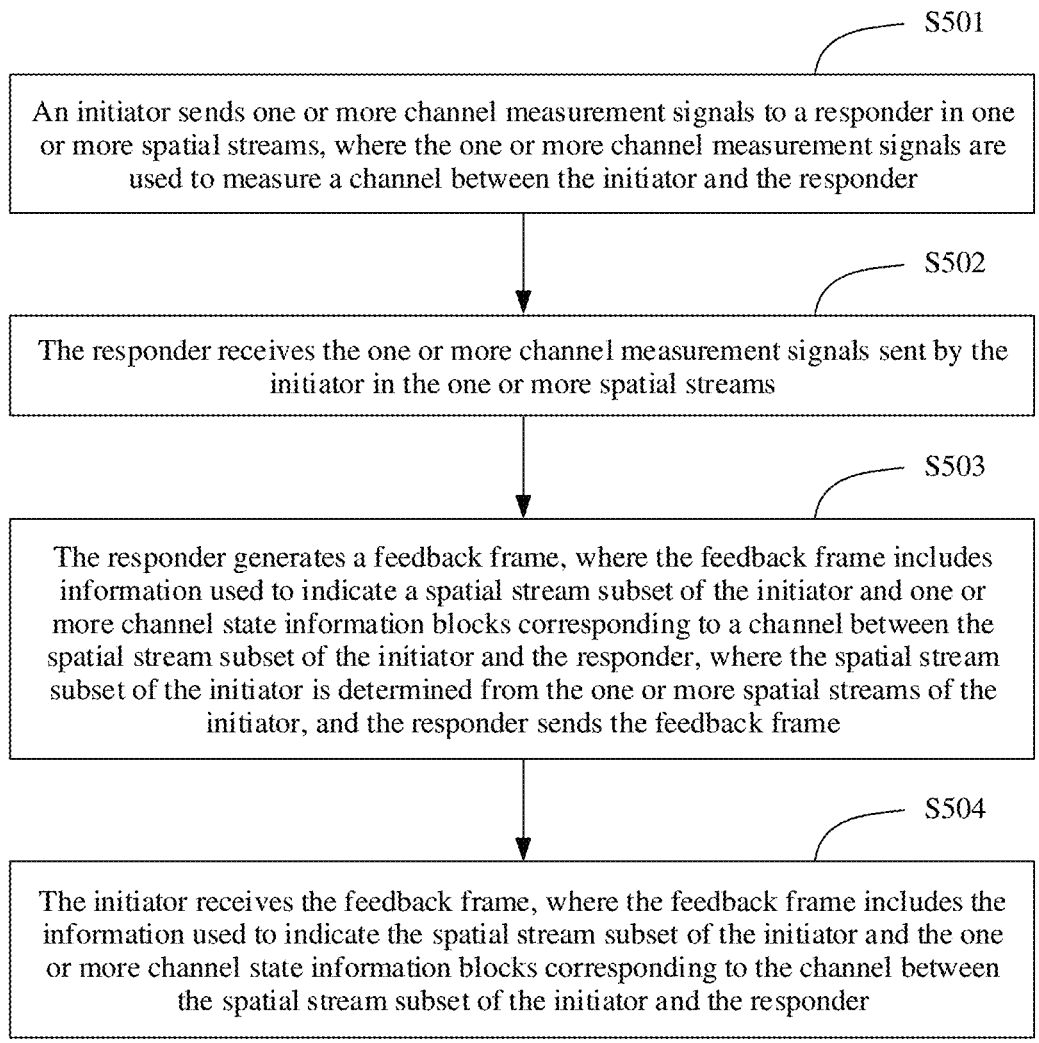
FIG. 5 is a schematic flowchart of still another channel state information transmission method according to an embodiment of the present invention.

FIG. 5 is a schematic flowchart of still another channel state information transmission method according to an embodiment of the present invention.

S501: An initiator sends one or more channel measurement signals to a responder in one or more spatial streams, where the one or more channel measurement signals are used to measure a channel between the initiator and the responder.

The step S501 is similar to the step S301. The initiator sends the one or more channel measurement signals to the responder in the one or more spatial streams, where the one or more spatial streams may be corresponding to one or more transmit antennas of the initiator. Similarly, the one or more spatial streams may come from one initiator, or may come from a plurality of initiators.

S502: The responder receives the one or more channel measurement signals sent by the initiator in the one or more spatial streams, where the one or more channel measurement signals are used to measure the channel between the initiator and the responder.

The responder receives the one or more channel measurement signals, measures, based on the one or more channel measurement signals, a channel between the one or more spatial streams and the responder, and obtains channel state information of the channel between the one or more spatial streams and the responder.

S503: The responder generates a feedback frame, where the feedback frame includes information used to indicate a spatial stream subset of the initiator and one or more channel state information blocks of a channel between the corresponding spatial stream subset of the initiator and the responder, where the spatial stream subset of the initiator is determined from the one or more spatial streams of the initiator, and the responder sends the feedback frame.

The spatial stream subset is a subset of the one or more spatial streams in which the one or more channel measurement signals are sent. In other words, the spatial stream subset is determined from the one or more spatial streams in which the one or more channel measurement signals are sent.

Correspondingly, in an optional manner, the information used to indicate the spatial stream subset of the initiator may be a bitmap, where each bitmap is corresponding to whether each of the one or more spatial streams in which the one or more channel measurement signals are sent is included in the spatial stream subset.

In another optional manner, the information used to indicate the spatial stream subset of the initiator may be a number ID of each spatial stream in the spatial stream subset.

The one or more channel state information blocks are similar to those in the step S303. Details are not described herein again.

Optionally, the feedback frame further includes but is not limited to one or a combination of the following: a feedback frame type identifier, a down-sampling rate Ng, a number Nc of columns, a measurement dialog identifier, a signal strength or a signal-to-noise ratio SNR, a channel state information feedback frame type identifier, a feedback compression type identifier, a codebook information field, and a measurement channel frequency-domain identifier corresponding to the feedback.

The specific functions of the fields are similar to those in the step S303. Details are not repeated here.

S504: The initiator receives the feedback frame, where the feedback frame includes the information used to indicate the spatial stream subset of the initiator and the one or more channel state information blocks of the channel between the corresponding spatial stream subset of the initiator and the responder.

Compared with the prior art in which all channel state information is included in the feedback frame, in this embodiment of the present invention, the feedback frame includes the spatial stream subset and the channel state information corresponding to the spatial stream subset. This reduces feedback overheads and improves feedback efficiency.

The transmit antenna subset/transmit sector subset/spatial stream subset in the foregoing embodiment may be determined in a plurality of manners.

In an optional manner, the responder itself may determine the transmit antenna subset from the one or more transmit antennas by using which the one or more channel measurement signals are sent.

Figure 6:
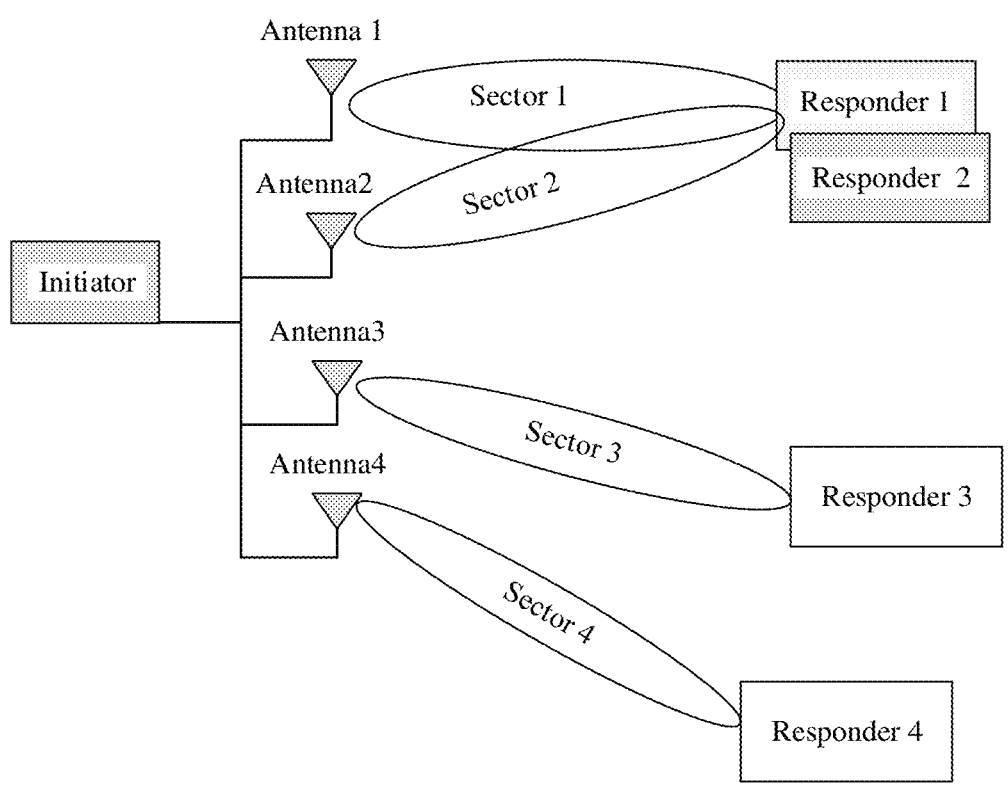
FIG. 6 is a schematic diagram of another application scenario according to an embodiment of the present invention.
Figure 7:
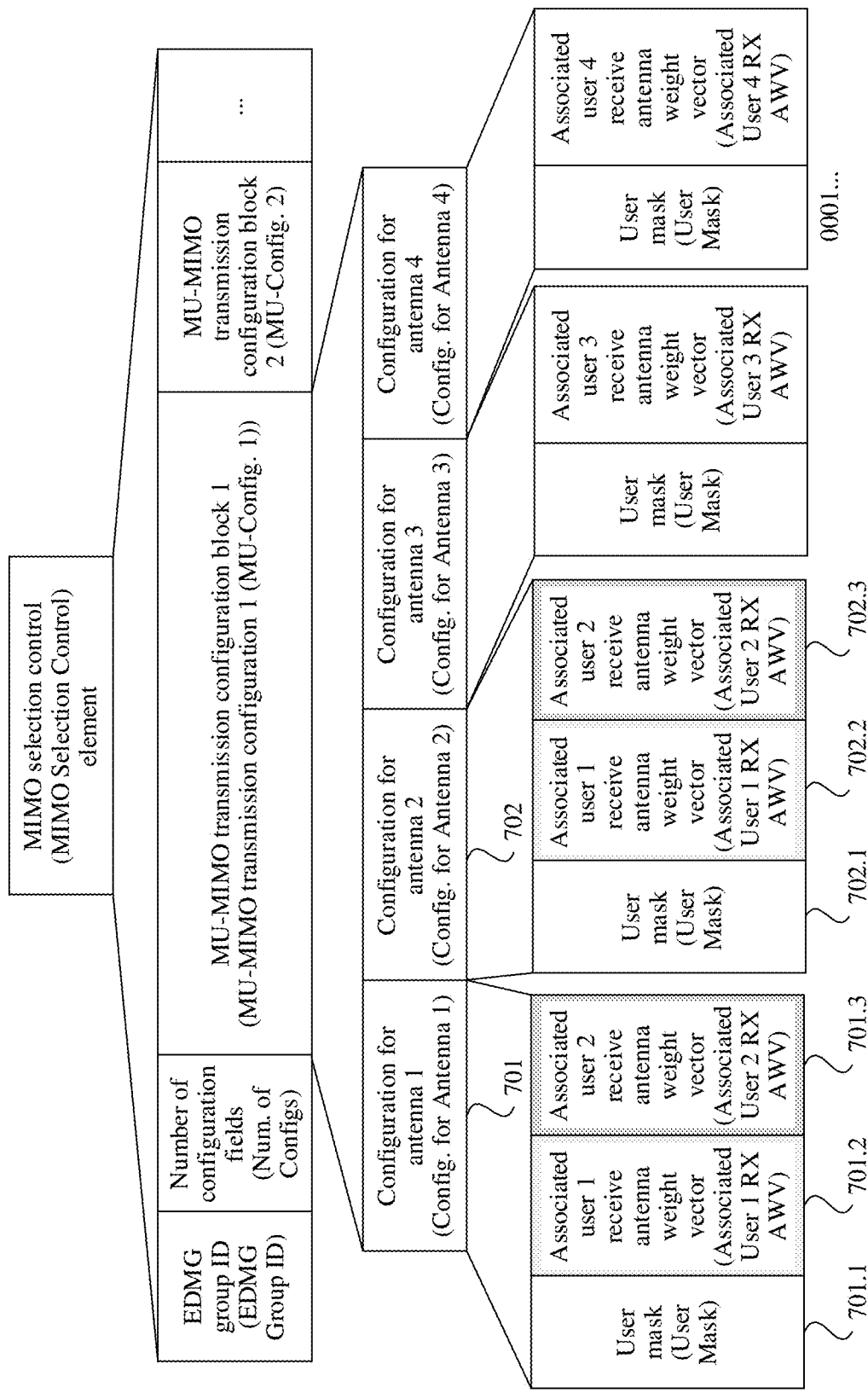
FIG. 7 is a schematic diagram of a data structure of a MIMO selection control element field according to an embodiment of the present invention.

In an example, in the selection phase in the foregoing analog beamforming process, the initiator sends a MIMO spatial configuration frame to the responder, where the MIMO spatial configuration frame includes a transmission configuration status of beamforming of the transmit antenna of the initiator, and the responder may determine the transmit antenna subset based on one or more user mask fields of the MIMO spatial configuration frame. It may be agreed in a protocol that a $j^{th}$ bit of a user mask field of an $i^{th}$ antenna in the user mask fields indicates whether an $i^{th}$ transmit antenna in the transmit antennas of the initiator is included in a transmit antenna subset of a feedback frame sent by a $j^{th}$ responder. The multiple-input multiple-output spatial configuration frame includes transceiver antenna information used when the one or more channel measurement signals are sent, transmit beam/sector/antenna weight vector AWV information corresponding to the transmit antenna, and receive beam/sector/antenna weight vector (AWV) direction information corresponding to a receive antenna. For example, as shown in FIG. 6, when the initiator includes four transmit antennas (transmit antennas 1, 2, 3, and 4), after the analog beamforming process, the transmit antenna 1 and the transmit antenna 2 of the initiator and receive antenna beams of a responder 1 and a responder 2 point to each other, and crosstalk between the transmit antenna 3 and the transmit antenna 4 of the initiator and the responder 1 and the responder 2 is relatively small. An antenna pointing mode of the initiator and the responder after analog beamforming in FIG. 6 is used as an example, and a data structure of a MIMO selection control element field (MIMO selection control element) in a MIMO spatial configuration frame corresponding to the antenna pointing mode may be shown in FIG. 7. The MIMO selection control element includes an EDMG group ID, a number of configuration (number of configs) fields field, and one or more MU-MIMO transmission configuration blocks. An MU-MIMO transmission configuration block 1 includes a configuration field 701 of the antenna 1, and the configuration field 701 of the antenna 1 includes a user mask field 701.1 (in this example, a value of the user mask field 701.1 is 1100), an associated user 1 receive antenna weight vector (AWV) field 701.2, and an associated user 2 receive AWV field 701.3. Similarly, a configuration field of the antenna 2 also includes a user mask field 702.1 (in this example, a value of the user mask field 702.1 is 1100), an associated user 1 receive AWV field 702.2, and an associated user 2 receive AWV field 702.3. The MIMO selection control element further includes another field that is not shown in FIG. 7, for example, an element ID field, a length field, or an element ID extension field. Using the responder 1 as an example, it can be learned that the responder 1 may learn, based on the MU-MIMO transmission configuration block of the MIMO selection control element, that the transmit antenna 1 (or a sector 1) and the transmit antenna 2 (or a sector 2) of the initiator and the responder 1 point to each other, and the transmit antenna 3 (or a sector 3) and the transmit antenna 4 (or a sector 4) cause little interference to the responder 1. Therefore, the transmit antenna 1 and the transmit antenna 2 of the initiator may be selected as the transmit antenna subset, or the transmit sector 1 and the transmit sector 2 of the initiator may be selected as the transmit sector subset. In addition, the feedback frame includes only channel state information of channels corresponding to the transmit antenna 1 and the transmit antenna 2. Therefore, the responder 1 does not need to feed back channel state information of channels corresponding to the four transmit antennas and the responder. This reduces feedback overheads.

In another example, the responder may determine the transmit antenna subset based on a received signal strength indicator (RSSI) or a channel amplitude (or power) gain coefficient from each transmit antenna of the initiator to the receive antenna of the responder. For example, the responder soils the received signal strength indicator (RSSI) or the channel amplitude (or power) gain coefficient from each transmit antenna of the initiator to the receive antenna of the responder. When signal strengths or channel amplitude (or power) gain coefficients of N transmit antennas each are relatively large and exceed a specific threshold, the N transmit antennas may be selected as the transmit antenna subset. Alternatively, one of the received signal strength indicators or the channel amplitude (or power) gain coefficients from the transmit antennas of the initiator to the receive antennas of the responder is used as an indicator, a maximum indicator value among all indicators from one or more antennas of the initiator to the receive antenna of the responder is multiplied by a factor, and a product is used as a threshold, to exclude a transmit antenna of the initiator whose indicator value is lower than the threshold. For example, a received signal strength indicator from the transmit antenna 1 of the initiator to the responder is 0.01 W, and is the strongest of the plurality of transmit antennas of the initiator. 0.01 W is multiplied by a factor 0.1, and a product 0.001 W is used as a threshold. A received signal strength indicator of the transmit antenna 2 of the initiator is 0.008 W, 0.008 W is higher than the threshold, and therefore the transmit antenna subset included in the feedback frame includes the transmit antenna. A received signal strength indicator of the transmit antenna 3 of the initiator is 0.0007 W, 0.0007 W is lower than the threshold, and therefore the transmit antenna subset included in the feedback frame does not include the transmit antenna. Alternatively, a received signal strength indicator of a station receive antenna is used as an indicator, a noise or noise plus interference strength is multiplied by a factor, and a product is used as a threshold, to exclude a transmit antenna, of the initiator, whose indicator is lower than the threshold. It should be noted that a method for determining the transmit sector subset and the spatial stream subset is similar to this method, and the transmit sector subset/spatial stream subset may also be determined by determining a received signal strength indicator corresponding to each transmit sector/spatial stream subset.

In another optional manner, the initiator may determine a transmit antenna subset/transmit sector subset/spatial stream subset whose channel state information needs to be fed back by the responder, and then indicate the transmit antenna subset/transmit sector subset/spatial stream subset to the responder. For example, the initiator may include, in a channel measurement signal, the transmit antenna subset/transmit sector subset/spatial stream subset whose channel state information needs to be fed back by the responder, and may further include, in a control trailer field of a control frame, information about the transmit antenna subset/transmit sector subset/spatial stream subset that needs to be fed back by each user. The initiator may further send a feedback inquiry frame, where the frame includes the information about the transmit antenna subset/transmit sector subset/spatial stream subset. For example, the feedback inquiry frame may include an antenna set field, where the antenna set field may be an antenna ID of a transmit antenna subset selected by the initiator, an antenna bitmap of a transmit antenna, or one or more user mask fields, or in another form.

The responder may feed back a corresponding channel coefficient after short interframe space (SIFS) of receiving the frame.

In this embodiment, the responder needs only to feed back channel state information of a channel corresponding to the transmit antenna subset/transmit sector subset/spatial stream subset, and does not need to feed back channel state information of all channels. This reduces feedback overheads. In addition, the initiator and the responder determine the transmit antenna subset/transmit sector subset/spatial stream subset whose channel state information needs to be fed back, so that the responder and the initiator may selectively feed back channel state information. This improves feedback flexibility.

The feedback frame in the foregoing embodiment may include one or more frequency-domain channel measurement feedback elements, and each frequency-domain channel measurement feedback element may include information used to indicate a transmit antenna subset and one or more channel state information blocks that represent channel state information between a transmit antenna subset of an initiator and one or more receive antennas of a responder. The frequency-domain channel measurement feedback element further includes an element ID field, a length field, and an element ID extension field. This element ID field can be used to identify a type of the frequency-domain channel measurement feedback element.

Figure 8:
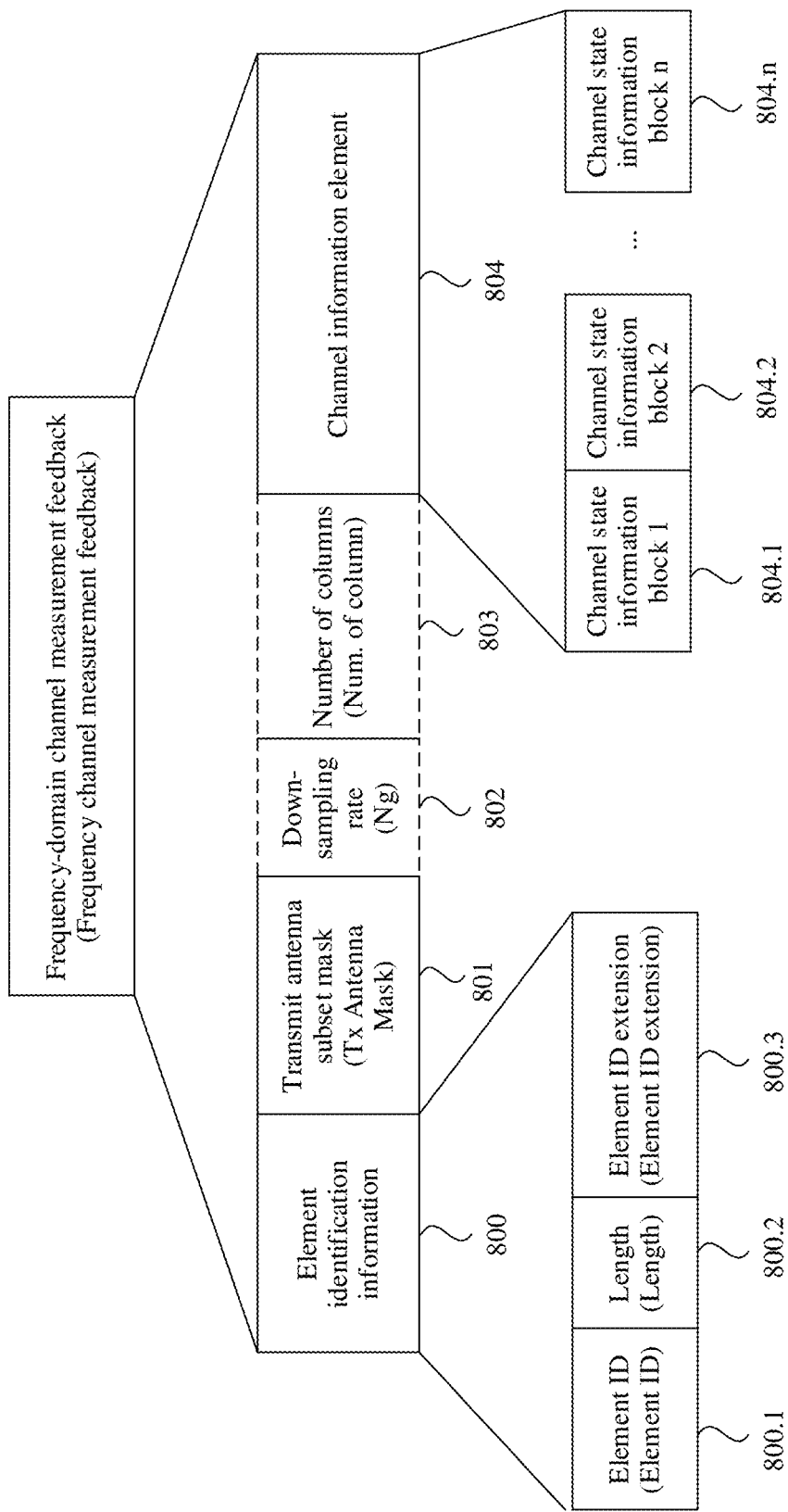
FIG. 8 is a schematic diagram of a data structure of a frequency-domain channel measurement feedback element according to an embodiment of the present invention.

In one example, an example structure of the frequency-domain channel measurement feedback element can be shown in FIG. 8. The frequency-domain channel measurement feedback element may include a transmit antenna bitmap, and the transmit antenna bitmap also refers to as a transmit antenna subset mask 801. Each bit is used to indicate whether a corresponding transmit antenna of the initiator is included in the transmit antenna subset. For example, when the initiator includes four transmit antennas 1, 2, 3, and 4, and the feedback frame feeds back only channel state information corresponding to the transmit antenna 1 and the transmit antenna 2, a value of a transmit antenna mask field may be 1100, and a value of a first bit is 1. Correspondingly, the transmit antenna 1 is included in the transmit antenna subset. Similarly, the transmit antenna 2 is also included in the transmit antenna subset, and the transmit antennas 3 and 4 are not included in the transmit antenna subset.

The frequency-domain channel measurement feedback element further includes a channel information element 804, where the channel information element 804 may include one or more channel state information blocks (for example, 804.1, 804.2, . . . , 804.*n*). Each channel state information block represents a frequency-domain channel coefficient of a channel corresponding to one sampling frequency. The frequency-domain channel coefficient may include an amplitude value and a phase shift of each element in a channel state information matrix corresponding to the sampling frequency, or may be a real part and an imaginary part of each element in a channel state information matrix. The channel state information block may alternatively include one or more angle values that can represent the channel state information. The one or more angle values are determined after the channel state information matrix corresponding to the sampling frequency is processed by using a Givens method.

It should be noted that the transmit antenna subset mask field 801 may alternatively be a mask of the transmit sector subset. For example, when sectors in which the initiator sends a channel measurement frame are sectors 1, 2, 3, and 4, a transmission configuration subset is a transmit sector subset, and the transmit sector subset includes the sector 1 and the sector 2, a value of a transmit sector subset mask may be 1100, to indicate that the sector 1 and the sector 2 are included in the transmit sector subset. Correspondingly, the channel information element 804 is channel state information of a channel between the corresponding transmit sector subset and the responder. The transmit antenna subset mask field 801 may alternatively be a mask of the spatial stream subset. For example, when spatial streams in which the initiator sends a channel measurement frame are spatial streams 1, 2, 3, and 4, a transmission configuration subset is a spatial stream subset, and the spatial stream subset includes spatial streams 1 and 2, a value of the spatial stream subset mask is 1100, to indicate that the spatial stream 1 and the spatial stream 2 are included in the spatial stream subset. Correspondingly, the channel information element 804 is channel state information of a channel between the corresponding spatial stream subset and the responder. The feedback frame includes only channel state information of channels corresponding to some of the transmission configuration sets. This reduces feedback overheads.

The frequency-domain channel measurement feedback element may further optionally include the following: a down-sampling rate Ng 802, used to indicate a down-sampling rate of the feedback frame, and a number Nc of columns 803, used to indicate a number of columns of a channel state information matrix corresponding to the one or more channel state information blocks.

Figure 9:
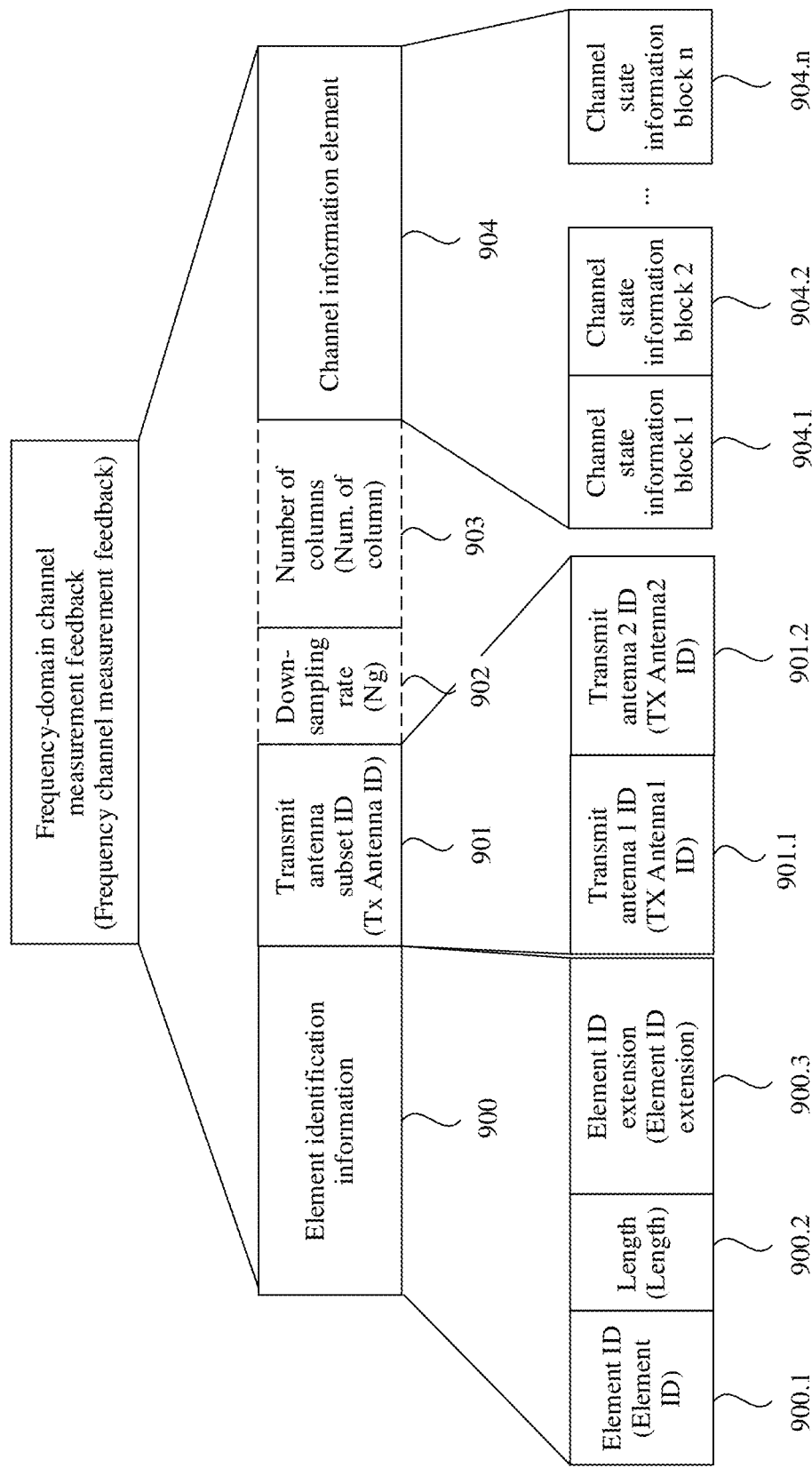
FIG. 9 is a schematic diagram of a data structure of another frequency-domain channel measurement feedback element according to an embodiment of the present invention.

In another example, an example structure of the frequency-domain channel measurement feedback element may be shown in FIG. 9. A transmit antenna subset ID field 901 may include an antenna ID of each transmit antenna in the transmit antenna subset. For example, when the transmit antenna subset includes the transmit antenna 1 and the transmit antenna 2, the transmit antenna subset ID field 901 includes an ID field 901.1 of the transmit antenna 1 and an ID field 901.2 of the transmit antenna 2. The other fields are similar to those in FIG. 8 above. In FIG. 9, an example in which the transmit antenna subset includes the transmit antenna 1 and the transmit antenna 2 is used. This does not constitute a limitation. It should also be noted that the field 901.1 may be an ID field of the transmit sector subset, and the ID field of the transmit sector subset includes an ID of each sector in the transmit sector subset. For example, the transmit sector subset includes IDs of the sector 1 and the sector 2. The field 901.1 may alternatively be an ID field of the spatial stream subset, and the ID field of the spatial stream subset includes an ID of each spatial stream in the spatial stream subset. The feedback frame includes only channel state information of channels corresponding to some transmission configuration sets. This reduces feedback overheads.

Figure 10A:
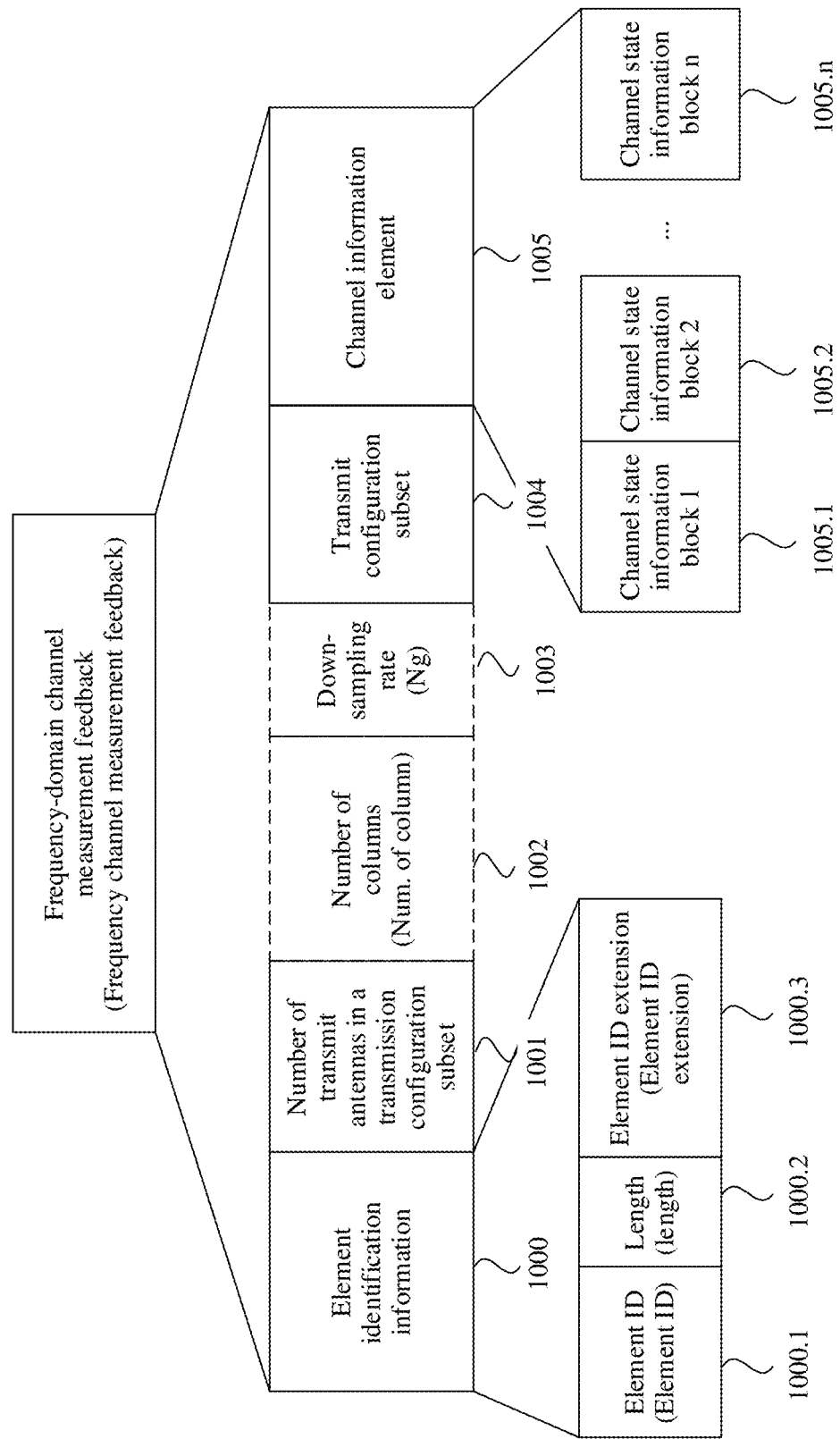
FIG. 10a is a schematic diagram of a data structure of still another frequency-domain channel measurement feedback element according to an embodiment of the present invention.

In still another example, an example structure of the frequency-domain channel measurement feedback element may be shown in FIG. 10a. The frequency-domain channel measurement feedback element may include a transmission configuration subset 1004, and the transmission configuration subset 1004 may include transmission configuration information of the initiator in the one or more channel state information blocks. For example, when the transmit antenna subset includes two transmit antennas: a transmit antenna 1 and a transmit antenna 2, and receive antennas corresponding to the two transmit antennas are a receive antenna 1 and a receive antenna 2. The transmission configuration subset 1004 may be shown in FIG. 10b, and the transmission configuration subset 1004 includes a sector 1 ID/AWV 1 ID/CDOWN 1 1004.1, a transmit antenna 1 ID (TX Antenna 1 ID) 1004.2, a receive antenna 1 ID (RX Antenna 1 ID) 1004.3, and a BRP CDOWN 1 1004.4, and a sector 2 ID/AWV 2 ID/CDOWN 2 1004.5, a transmit antenna 2 ID (TX Antenna 2 ID) 1004.6, a receive antenna 2 ID (RX Antenna 2 ID) 1004.7, and a BRP CDOWN 2 1004.8.

The frequency-domain channel measurement feedback element further includes a channel information element 1005, where the channel information element 1005 is similar to the foregoing channel information element 804. Details are not described herein again. Optionally, the frequency-domain channel measurement feedback element may further include but is not limited to: a number 1001 of transmit antennas in the transmission configuration subset, a number Nc of columns 1002, a down-sampling rate Ng 1003, and the like. The number 1001 of the transmit antennas in the transmission configuration subset and the number Nc of columns help the initiator determine a dimension of a channel state information matrix corresponding to the channel information element 1005. It should be noted that a sequence of the number 1001 of the transmit antennas in the transmission configuration subset, the number Nc 1002, and the down-sampling rate 1003 may be changed. This is not limited to the example shown in FIG. 10a. The feedback frame includes only the channel state information of the channel corresponding to the transmit antenna subset/transmit sector subset/spatial stream subset. This reduces overheads of the feedback frame. Further, complete transmission configuration subset information is included, so that when the initiator sends a plurality of groups of channel measurement signals, feedback for the plurality of groups of channel measurement signals can be provided. This improves flexibility.

In this embodiment of the present invention, the feedback frame includes the one or more channel state information blocks of the channel between the corresponding transmit antenna subset/transmit sector subset/spatial stream subset and the responder, each channel state information block may include the frequency-domain channel coefficient corresponding to one sampling frequency, and the frequency-domain channel coefficient may include the amplitude value and the phase shift of each element in the channel state information matrix corresponding to the sampling frequency, or may be the real part and the imaginary part of each element in the channel state information matrix. The channel state information block may alternatively include the one or more angle values that can represent the channel state information. The one or more angle values are determined after the channel state information matrix corresponding to the sampling frequency is processed by using the Givens method.

In an example, the one or more channel state information blocks may include the one or more angle values determined by using the Givens method. A quantity of the angle values is denoted as Na, and is referred to as a V matrix coefficient. The one or more channel state information blocks may further include a signal-to-noise ratio SNR that is of each spatial stream in the spatial stream subset and that is measured based on the channel measurement signal. An example structure of the channel state information block may be shown in FIG. 11a. For example, the spatial stream subset includes Ns spatial streams, channel state information blocks of the Ns spatial streams include SNR values corresponding to the Ns spatial streams, and an SNR value corresponding to an $N^{th}$ spatial stream is SNR_Ns. Ns is a number of columns of the V matrix, and a quantity of antennas of the transmit antenna subset is corresponding to a number of rows of the V matrix.

In another example, the one or more channel state information blocks may include a signal-to-noise ratio SNR of each spatial stream in the spatial stream subset measured based on a channel measurement signal, and may further include a channel state information (CSI) matrix. The channel state information CSI matrix includes a channel coefficient that represents the channel state information. An example structure of the channel state information block may be shown in FIG. 11b. For example, if a quantity of elements in a channel matrix corresponding to a spatial stream subset is N, real part and imaginary part information of the N elements are included.

In still another example, the one or more channel state information blocks may include a signal-to-noise ratio SNR corresponding to each receive antenna of the responder. It is assumed that there are Nr receive antennas of the responder, signal-to-noise ratio SNR values corresponding to the Nr receive antennas are included, and a channel state information CSI matrix may further be included. The channel state information CSI matrix may include a channel coefficient, and the channel state information CSI matrix includes a channel coefficient that represents the channel state information. An example structure of the channel state information block may be shown in FIG. 11c. For example, if the channel state information CSI matrix corresponding to the transmit antenna subset/spatial stream subset/sector subset includes N elements, real part and imaginary part information of the N elements are included.

The channel coefficient included in the channel state information CSI matrix may be a channel coefficient of an original channel matrix, or a channel coefficient obtained after the channel matrix is processed, or a beamforming coefficient obtained after the channel matrix is processed by the responder based on measurement.

In an example, the channel coefficient is obtained after the responder measures the received measurement signal. When each transmit antenna of the initiator uses a different reference signal sequence (or uses a time division measurement manner or another orthogonal or pseudo-orthogonal manner), the responder may measure a receiving status of each reference signal sequence of the receive antenna of the responder. In other words, each reference signal sequence is corresponding to one physical antenna. Therefore, a channel coefficient of a channel between the receive antenna of the responder and each transmit antenna of the initiator may be obtained. It is assumed that the responder has Nr receive antennas participating in measurement, the initiator uses Nt transmit antennas for transmission, and the responder or the initiator may determine Nx transmit antennas in the Nt transmit antennas by using the method in the foregoing embodiment. The channel matrix may be H, and a dimension of H is Nr rows×Nx columns. The channel state information matrix may include a channel coefficient corresponding to the original channel matrix H. Alternatively, the channel state information matrix is in a form of a transpose of H, and a dimension of the transpose of H is Nx row×Nr column.

In another example, the initiator may alternatively perform precoding on a plurality of transmit antennas by using which a reference signal sequence is sent. In this case, the channel coefficient measured by the responder is actually a channel coefficient corresponding to a valid channel that the reference signal goes through. In this case, the channel state information matrix may include a channel coefficient corresponding to a channel matrix of the valid channel.

In still another example, the channel coefficient included in the channel state information matrix fed back by the responder may be a channel coefficient before spatial filtering processing (namely, a channel coefficient on a baseband port), or may be a channel coefficient after spatial filtering processing. For example, the responder may perform singular value decomposition (SVD) on the channel matrix H, and the responder may feed back a processed matrix V. Certainly, the responder may further perform spatial filtering processing in another manner. This is not specifically limited in this embodiment.

In still another example, in addition to directly feeding back the channel matrix or the processed channel matrix, the responder may further feed back a precoding vector (also referred to as a baseband beamforming vector), and the corresponding channel state information matrix may be information about the precoding vector. For example, when the initiator has Nt antennas or Nt active antennas (a physical antenna is connected to an RF chain and is in an enabled state during transmission), for each selected precoding vector w, a vector size is Nt×1. When the responder selects Np precoding vectors, a precoding matrix W may be formed, and a matrix size is Nt×Np. In this case, the channel state information matrix fed back by the responder is the precoding matrix W.

FIG. 12 is a schematic diagram of a frame structure of a feedback frame according to an embodiment of the present invention. In a possible implementation, the feedback frame may be a MIMO beamforming feedback frame, that is, the MIMO BF feedback frame is a type of action. In addition to a frame category field, an unprotected DMG action field, a dialog token field, and a MIMO feedback control element field, one or more channel measurement feedback element fields, one or more EDMG channel measurement feedback element fields, the feedback frame may further include a newly added field, where the newly added field is the one or more frequency-domain channel measurement feedback element fields described in any one of FIG. 8, FIG. 9, and FIG. 10a.

Figure 10B:
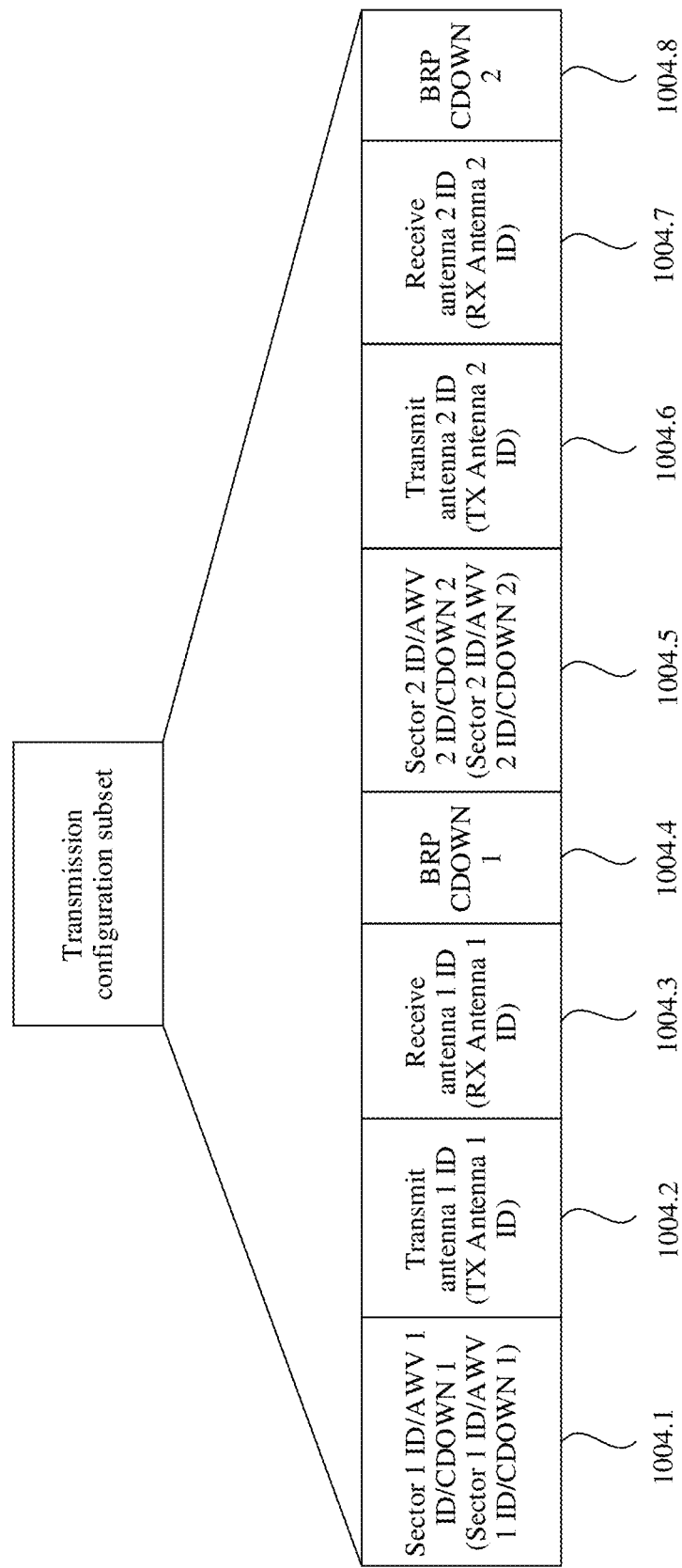
FIG. 10b is a schematic diagram of a data structure of a transmission configuration subset field according to an embodiment of the present invention.

In a possible implementation, the MIMO feedback control field of the feedback frame may further include a MIMO feedback type field. An example structure of the MIMO feedback type field may be shown in FIG. 13. The MIMO feedback type field may include but is not limited to one or more of the following: a frequency channel measurement feedback field identifier field (frequency channel measurement present) 1302 is used to identify whether the feedback frame includes a frequency-domain channel measurement feedback element field. For example, when a value of the identifier field is 1, it indicates that the feedback frame includes the frequency-domain channel measurement feedback element field, a transmission configuration subset identifier field 1303 is used to identify whether the frequency-domain channel measurement feedback element field includes a transmission configuration subset field. When the transmission configuration subset is a transmit antenna subset/transmit sector subset/spatial stream subset, and information used to indicate the transmission configuration subset is a transmit antenna subset mask/transmit sector subset mask/spatial stream subset mask, the transmission configuration subset identifier field may actually be used to identify whether the frequency-domain channel measurement feedback element includes the transmit antenna subset mask/transmit sector subset mask/spatial stream subset mask. When the transmission configuration subset includes one or more groups of transmission configurations, for example, as shown in FIG. 10b, the transmission configuration subset identifier field may actually be used to identify whether the frequency-domain channel measurement feedback element field includes one or more groups of transmission configurations, and a codebook information field 1307 is used to indicate a number of quantization bits corresponding to a preset quantization mode used for a value in the one or more channel state information blocks.

Optionally, the feedback frame may further include the following: a down-sampling rate field (Ng) 1304, used to indicate a down-sampling rate of the feedback frame, a number of rows field 1305, used to identify a number of rows of a channel matrix of a channel between a corresponding transmission configuration subset and an initiator, and a number of columns field 1306, used to identify a number of columns of a channel matrix of a channel between a corresponding transmission configuration subset and an initiator.

The feedback frame may further include but is not limited to another field (not shown in FIG. 13): a channel state information feedback frame type identifier, used to indicate whether the one or more channel state information blocks use a channel time-domain coefficient or a frequency-domain coefficient, a feedback compression type identifier, used to indicate that the one or more channel state information blocks use a frequency-domain compressed coefficient matrix or a frequency-domain non-compressed coefficient matrix, a measurement dialog identifier, used to indicate a measurement dialog in which the channel measurement signal corresponding to the feedback frame is located, and a measurement channel frequency-domain identifier corresponding to the feedback, used to indicate channel bandwidth or a frequency-domain resource block corresponding to the one or more channel state information blocks.

When the one or more frequency-domain channel measurement feedback element fields (for example, as shown in FIG. 8, FIG. 9, and FIG. 10*a*) each do not include a number of columns field of a channel matrix and a down-sampling rate field (Ng), the MIMO feedback type field may include the number of columns field 1306 of the channel matrix, the number of rows field 1305 of the channel matrix, and the down-sampling rate field (Ng) 1304.

When the one or more frequency-domain channel measurement feedback element fields (for example, as shown in FIG. 8, FIG. 9, and FIG. 10*a*) each include a number of columns field of a channel matrix and a down-sampling rate field (Ng), the MIMO feedback type field may not include the number of columns field 1306 of the channel matrix, the number of rows field 1305 of the channel matrix, and the down-sampling rate field (Ng) 1304.

It should be noted that an arrangement order of fields included in the MIMO feedback type field may be changed.

In another implementation, the feedback frame may be a new type of feedback frame, and an example structure of the feedback frame may be shown in FIG. 14. The feedback frame includes a frame category field, an unprotected DMG action field, a dialog token field, and a MIMO feedback control element field, one or more channel measurement feedback element fields, and one or more EDMG channel feedback element fields.

In an example, the MIMO feedback control element field of the feedback frame may include one feedback type flag bit, and the feedback type flag bit is used to indicate whether the EDMG channel feedback element field in the feedback frame is a time feedback channel element or a frequency-domain channel measurement feedback element. For example, the feedback type flag bit is indicated by using one bit. When a value of the bit is 1, it indicates that the EDMG channel feedback element field included in the feedback frame is the foregoing frequency-domain channel measurement feedback element (for example, as shown in FIG. 8, FIG. 9, and FIG. 10*a*). When a value of the bit is 0, it indicates that the EDMG channel feedback element field included in the feedback frame is the time-domain feedback channel element. It may be understood that a value of the feedback type flag bit and a meaning corresponding to the feedback type flag bit each are changeable.

In still another implementation, the feedback frame may be another new type of feedback frame. For example, as shown in FIG. 15, the feedback frame includes a frame category field, an unprotected DMG action field, a dialog token field, a MIMO feedback control element field, one or more channel measurement feedback element fields, and one or more of the foregoing frequency-domain channel measurement feedback element fields (for example, as shown in FIG. 8, FIG. 9, and FIG. 10*a*). In the feedback frame, an ID value of an element ID field of the frequency-domain channel measurement feedback element field may be different from an ID value of an element ID field of another channel feedback element field. Therefore, after receiving the feedback frame, the initiator may accurately obtain the frequency-domain channel measurement feedback element field based on the element ID field, and reads one or more channel state information blocks included in the field.

Figure 16:
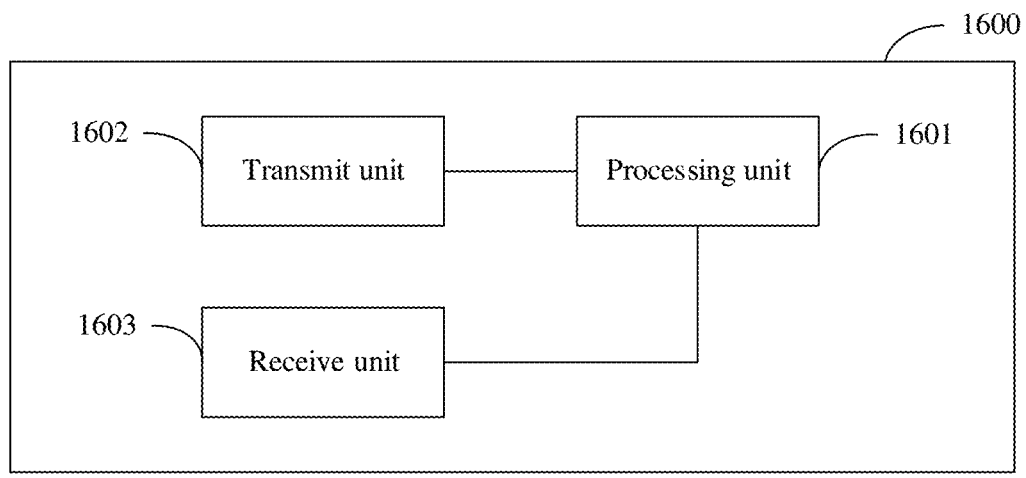
FIG. 16 is a schematic structural diagram 1 of a channel state information transmission apparatus according to an embodiment of the present invention.

FIG. 16 is a schematic structural diagram of a possible initiator apparatus 1600 or responder apparatus 1600 according to an embodiment of the present invention. The apparatus 1600 may be configured to have functions of the foregoing initiator 201 and the foregoing responder 202. The apparatus 1600 may include a transmit unit 1603, a processing unit 1602, and a receive unit 1601.

When the apparatus 1600 is used as an example structure of the responder 202, the processing unit 1602 is configured to generate a feedback frame, where the feedback frame includes information used to indicate a transmit antenna subset of an initiator and one or more channel state information blocks that represent channel state information between the transmit antenna subset of the initiator and one or more receive antennas of the responder, where the transmit antenna subset of the initiator is determined from one or more transmit antennas of the initiator. The processing unit 1602 is further configured to generate a feedback frame, where the feedback frame includes information used to indicate a transmit sector subset of an initiator and one or more channel state information blocks of a channel between the corresponding transmit sector subset of the initiator and a responder, where the transmit sector subset of the initiator is determined from one or more transmit sectors of the initiator. The processing unit 1602 is further configured to generate a feedback frame, where the feedback frame includes information used to indicate a spatial stream subset of an initiator and one or more channel state information blocks that represent channel state information between the corresponding spatial stream subset of the initiator and the responder, where the spatial stream subset of the initiator is determined from the one or more spatial streams of the initiator.

The transmit unit 1603 may be configured to send the feedback frame.

The receive unit 1601 may be configured to: before the processing unit 1602 generates the feedback frame, receive one or more channel measurement signals sent by the initiator on one or more specific transmit beams corresponding to the one or more transmit antennas. The receive unit

1601 may further be configured to receive one or more channel measurement signals sent by the initiator in one or more sectors. The receive unit 1601 may further be configured to receive one or more channel measurement signals sent by the initiator in one or more spatial streams.

When the apparatus 1600 is used as an example structure of the initiator 201, the receive unit 1601 may be configured to receive a feedback frame sent by a responder, where the feedback frame includes information used to indicate a transmit antenna subset of an initiator and one or more channel state information blocks that represent channel state information between the transmit antenna subset of the initiator and one or more receive antennas of the responder, where the transmit antenna subset of the initiator is determined from one or more transmit antennas of the initiator. The receive unit 1601 may further be configured to receive a feedback frame sent by a responder, where the feedback frame includes information used to indicate a transmit sector subset of an initiator and one or more channel state information blocks of a channel between the corresponding transmit sector subset of the initiator and a responder, where the transmit sector subset of the initiator is determined from one or more transmit sectors of the initiator. The receive unit 1601 may further be configured to receive a feedback frame sent by a responder, where the feedback frame includes information used to indicate a spatial stream subset of an initiator and one or more channel state information blocks of a channel between the corresponding spatial stream subset of the initiator and the responder, where the spatial stream subset of the initiator is determined from one or more spatial streams of the initiator.

The processing unit 1602 may be configured to obtain, based on the information used to indicate the transmit antenna subset of the initiator, the one or more channel state information blocks that represent the channel state information between the transmit antenna subset of the initiator and the one or more receive antennas of the responder.

For operating principles of the initiator apparatus 1600 or the responder apparatus 1600, refer to FIG. 3 to FIG. 15 and method descriptions corresponding to the initiator apparatus 1600 or the responder apparatus 1600. Details are not described herein again.

Figure 17:
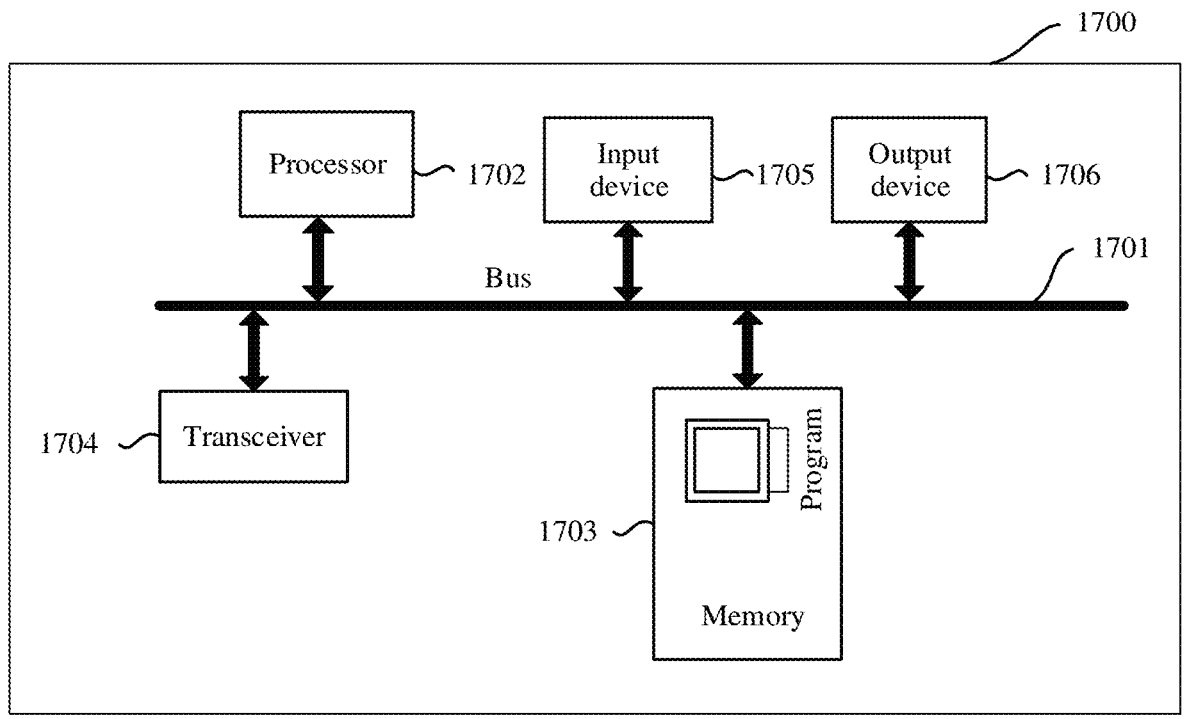
FIG. 17 is a schematic structural diagram 2 of a channel state information transmission apparatus according to an embodiment of the present invention.

FIG. 17 is a possible schematic structural diagram of a channel state information transmission apparatus 1700 according to the foregoing embodiment. The apparatus 1700 may be configured as the foregoing initiator 201, or may be configured as the foregoing responder 202. The apparatus 1700 may include a processor 1702, a computer-readable storage medium/memory 1703, a transceiver 1704, an input device 1705, an output device 1706, and a bus 1701. The processor 1702, the transceiver 1704, the computer-readable storage medium 1703, and the like are connected by using the bus. This embodiment of the present invention imposes no limitation on a specific connection medium between the parts.

It may be understood that the foregoing channel state information transmission apparatus may serve as an initiator in a scenario, and may serve as a responder in another scenario.

When the apparatus 1700 is used as the initiator, the transceiver 1704 may be configured to perform communication between the initiator and one or more responders, and may perform a sending/receiving process of the initiator in FIG. 3 to FIG. 15 and/or another process used for the technology described in this application. For example, the transceiver 1704 may be configured to receive a feedback frame sent by a responder and may further be configured to: before the feedback frame is received, send one or more channel measurement signals to the one or more responders on one or more specific transmit beams corresponding to one or more transmit antennas. Certainly, the transceiver 1704 may further be configured to perform other process and method of the technology described in the present invention.

The processor 1702 is configured to control and manage an action of the initiator, is configured to perform processing performed by the initiator in the foregoing embodiments, may perform processing process of the initiator in FIG. 3 to FIG. 15 and/or another process used for the technology described in this application, may be responsible for managing the bus, and may execute a program or an instruction stored in the memory. For example, the processor 1702 may be configured to obtain, based on information used to indicate a transmit antenna subset of an initiator, one or more channel state information blocks that represent channel state information between the transmit antenna subset of the initiator and one or more receive antennas of a responder.

The computer-readable storage medium/memory 1703 stores a program, an instruction, or data for performing the technical solutions of the present invention. For example, the computer-readable storage medium/memory 1703 may include a program sufficient to allow the apparatus 1700 to receive the feedback frame of the responder, and may further include a program sufficient to allow the apparatus 1700 to obtain the one or more channel state information blocks, in the feedback frame, of the channel between the corresponding transmit antenna subset of the initiator and the responder.

When the apparatus 1700 is used as the responder, the transceiver 1704 may be configured to perform communication between the responder and the foregoing initiator, and may perform a sending/receiving process of the responder in FIG. 3 to FIG. 15 and/or another process used for the technology described in this application. For example, the transceiver 1704 may be configured to send a feedback frame and may further be configured to: before the feedback frame is sent, receive one or more channel measurement signals sent by the initiator. Certainly, the transceiver 1704 may further be configured to perform other process and method of the technology described in the present invention.

The processor 1702 is configured to control and manage an action of the responder, is configured to perform processing performed by the responder in the foregoing embodiments, may perform processing process of the responder in FIG. 3 to FIG. 15 and/or another process used for the technology described in this application, may be responsible for managing the bus, and may execute a program or an instruction stored in the memory. For example, the processor 1702 can generate a feedback frame, where the feedback frame includes information used to indicate a transmit antenna subset of an initiator and one or more channel state information blocks that represent channel state information between the transmit antenna subset of the initiator and one or more receive antennas of a responder. The processor 1702 is further configured to determine the transmit antenna subset from one or more transmit antennas of the initiator based on user mask fields included in a multiple-input multiple-output spatial configuration frame sent by the initiator in an analog beamforming phase.

The computer-readable storage medium/memory 1703 stores a program, an instruction, or data for performing the technical solutions of the present invention. For example, the computer-readable storage medium/memory 1703 may include a program sufficient to allow the apparatus 1700 to generate the feedback frame, and may further include a program sufficient to allow the apparatus 1700 to send the feedback frame to the initiator.

It may be understood that FIG. 17 shows only a simplified design of an initiator apparatus or a responder apparatus. In actual application, the initiator apparatus and the responder apparatus each may include any quantity of transceivers, processors, memories, and the like, and all apparatuses that can implement the present invention fall within the protection scope of the present invention.

The processors 1702 in the apparatus 1700 may be general-purpose processors such as general-purpose central processing units (CPU), network processors (NP), or microprocessors, or may be application-specific integrated circuits (ASIC), or one or more integrated circuits configured to control program execution in the solutions of this application. The processors 1702 may be alternatively digital signal processors (DSP), field-programmable gate arrays (FPGA) or other programmable logic devices, discrete gates or transistor logic devices, or discrete hardware components. Alternatively, the controller/processor may be a combination implementing a computing function, for example, a combination that includes one or more microprocessors, or a combination of a DSP and a microprocessor. The processor usually performs logical and arithmetic operations based on a program instruction stored in the memory.

The computer-readable storage medium/memory 1703 may further store an operating system and another application program. Specifically, the program may include program code, and the program code includes a computer operation instruction. More specifically, the memory may be a read-only memory (ROM), another type of static storage device that can store static information and an instruction, a random access memory (RAM), another type of dynamic storage device that can store information and an instruction, a magnetic disk memory, or the like. The memory 1703 may be a combination of the foregoing storage types. In addition, the computer-readable storage medium/memory may be located in the processor, or may be located outside the processor, or distributed in a plurality of entities including a processor or a processing circuit. The computer-readable storage medium/memory may be specifically embodied in a computer program product. For example, the computer program product may include a computer-readable medium in packaging materials.

Alternatively, the apparatus 1700 may be configured as a universal processing system. For example, the universal processing system is usually referred to as a chip. The general processing system includes one or more microprocessors that provide a processor function, and an external memory that provides at least a part of the storage medium. All these components are connected to other supporting circuits by using an external bus architecture.

Method or algorithm steps described in combination with the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. Whether it is referred to as software, firmware, middleware, microcode, hardware description language, or another term, the software should be broadly interpreted as an instruction, an instruction set, code, a code segment, program code, a program, a subprogram, a software module, an application, a software application, a software package, a routine, a subroutine, an object, an executable file, an execution thread, a procedure, a function, and the like. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A channel state information feedback method, comprising:
    generating, by a responder, a feedback frame, wherein the feedback frame is associated with a subset of transmit antennas of transmit antennas of an initiator and is generated in response to the responder receiving channel measurement signals sent on transmit antennas of an initiator, wherein the feedback frame comprises information indicating a subset of transmit antennas of the transmit antennas of the initiator and one or more channel state information blocks that represent channel state information between the subset of transmit antennas of the initiator and one or more receive antennas of the responder, wherein the one or more channel state information blocks are associated with each antenna of the subset of transmit antennas and are associated with one or more signals of the channel measurement signals, and wherein the feedback frame excludes any channel state information block for one or more of the transmit antennas of the initiator on which a channel measurement signal is transmitted; and
    sending, by the responder, the feedback frame.

2. The method according to claim 1, further comprising:
    determining the subset of transmit antennas of the initiator based on one or more user mask fields of a multiple-input multiple-output spatial configuration frame sent by the initiator.

3. The method according to claim 1, wherein the information indicating the subset of transmit antennas of the initiator is a transmit antenna mask field, and wherein the transmit antenna mask field comprises a bitmap, wherein one bit in the bitmap indicating whether channel state information of one antenna of the transmit antennas of the initiator needs to be feedback.

4. The method according to claim 3, wherein a value of the one bit being 1 indicates that channel state information of a corresponding transmit antenna needs to be feedback and wherein the value of the one bit being 0 indicates that channel state information of a corresponding transmit antenna does not need to be feedback.

5. The method according to claim 1, wherein the information indicating the subset of transmit antennas of the initiator comprises an antenna identifier (ID) of each transmit antenna of whose channel state information needs to be feedback.

6. The method according to claim 1, wherein the feedback frame further comprises one or more of:
  a responder receive antenna identifier (ID) corresponding to the subset of transmit antennas of the initiator;
  a transmit sector ID or an antenna weight vector (AWV) number corresponding to the subset of transmit antennas of the initiator;
  a spatial stream number corresponding to the subset of transmit antennas of the initiator;
  a transmit sector CDOWN value corresponding to the subset of transmit antennas of the initiator;
  a feedback frame type identifier that indicates a type of the feedback frame;
  a down-sampling rate Ng that indicates a down-sampling rate of the feedback frame;
  a number Nc of columns that indicates a number of columns of a channel state information matrix corresponding to the one or more channel state information blocks;
  a measurement dialog identifier that indicates a measurement dialog in which a channel measurement signal corresponding to the feedback frame is located;
  a signal strength or a signal-to-noise ratio (SNR) that indicates a signal strength or a signal-to-noise ratio (SNR) of each column in the channel state information matrix;
  a channel state information feedback frame type identifier that indicates whether the one or more channel state information blocks are of a channel time-domain coefficient or a frequency-domain coefficient;
  a feedback compression type identifier that indicates that the one or more channel state information blocks use a frequency-domain compressed coefficient matrix or a frequency-domain non-compressed coefficient matrix;
  a codebook information field that indicates a number of quantization bits corresponding to a preset quantization mode used for a value in the one or more channel state information blocks; and
  a measurement channel frequency-domain identifier corresponding to the feedback that indicates channel bandwidth or a frequency-domain resource block corresponding to the one or more channel state information blocks.

7. A channel state information receiving method, comprising:
  receiving, by an initiator, a feedback frame, wherein the feedback frame is received in response to the initiator sending channel measurement signals on transmit antennas of the initiator and is associated with a subset of transmit antennas of the transmit antennas of the initiator, wherein the feedback frame comprises information indicating the subset of transmit antennas of the initiator and further comprises one or more channel state information blocks that represent channel state information between the subset of transmit antennas of the initiator and one or more receive antennas of a responder, wherein the one or more channel state information blocks are associated with each antenna of the subset of transmit antennas and are associated with one or more signals of the channel measurement signals, and wherein the feedback frame excludes any channel state information block for one or more of the transmit antennas of the initiator on which a channel measurement signal is transmitted; and
  obtaining, according to the information indicating the subset of transmit antennas of the initiator, the one or more channel state information blocks that represent the channel state information between the subset of transmit antennas of the initiator and the one or more receive antennas of the responder.

8. The method according to claim 7, wherein the information indicating the subset of transmit antennas of the initiator is a transmit antenna mask field, wherein the transmit antenna mask field comprises a bitmap, and wherein one bit in the bitmap indicating whether channel state information of one antenna of the transmit antennas of the initiator needs to be feedback.

9. The method according to claim 8, wherein a value of the one bit being 1 indicates that channel state information of a corresponding transmit antenna needs to feedback, and wherein the value of the one bit being 0 indicates that channel state information of a corresponding transmit antenna does not need to be feedback.

10. The method according to claim 7, further comprising:
  sending, by the initiator, a multiple-input multiple-output spatial configuration frame comprises one or more user mask fields which indicating the subset of transmit antennas of the initiator.

11. A channel state information feedback apparatus in wireless communications system, wherein the apparatus comprises:
  a processor; and
  a non-transitory computer readable storage medium storing a program for execution by the processor, the program including instructions to:
    generate a feedback frame, wherein the feedback frame is generated in response to receiving, on a subset of transmit antennas of transmit antennas of an initiator, channel measurement signals sent on transmit antennas of an initiator, wherein the feedback frame comprises information indicating a subset of transmit antennas of the transmit antennas of the initiator and one or more channel state information blocks that represent channel state information between the subset of transmit antennas of the initiator and one or more receive antennas of a responder, wherein the one or more channel state information blocks are associated with each antenna of the subset of transmit antennas and are associated with one or more signals of the channel measurement signals, and wherein the feedback frame excludes any channel state information block for one or more of the transmit antennas of the initiator on which a channel measurement signal is transmitted; and
    send the feedback frame.

12. The apparatus according to claim 11, wherein the program further includes instructions to:
  determine the subset of transmit antennas of the initiator based on one or more user mask fields of a multiple-input multiple-output spatial configuration frame sent by the initiator.

13. The apparatus according to claim 11, wherein the information indicating the subset of transmit antennas of the initiator is a transmit antenna mask field, wherein the transmit antenna mask field comprises a bitmap, and wherein one bit in the bitmap indicating whether channel state information of one antenna of the transmit antennas of the initiator needs to be feedback.

14. The apparatus according to claim 13, wherein a value of the one bit being 1 indicates that channel state information of a corresponding transmit antenna needs to feedback, and wherein the value of the one bit being 0 indicates that channel state information of a corresponding transmit antenna does not need to be feedback.

15. The apparatus according to claim 11, wherein the information indicating the subset of transmit antennas of the initiator comprises an antenna identifier (ID) of each transmit antenna of whose channel state information needs to be feedback.

16. The apparatus according to claim 11, wherein the feedback frame further comprises one or more of:
 a responder receive antenna identifier (ID) corresponding to the subset of transmit antennas of the initiator;
 a transmit sector ID or an antenna weight vector (AWV) number corresponding to the subset of transmit antennas of the initiator;
 a spatial stream number corresponding to the subset of transmit antennas of the initiator;
 a transmit sector CDOWN value corresponding to the subset of transmit antennas of the initiator;
 a frame type identifier that indicates a type of the feedback frame;
 a down-sampling rate Ng that indicates a down-sampling rate of the feedback frame;
 a number Nc of columns that indicates a number of columns of a channel state information matrix corresponding to the one or more channel state information blocks;
 a measurement dialog identifier that indicates a measurement dialog in which a channel measurement signal corresponding to the feedback frame is located;
 a signal strength or a signal-to-noise ratio SNR that indicates a signal strength or a signal-to-noise ratio (SNR) of each column in the channel state information matrix;
 a channel state information feedback frame type identifier that indicates whether the one or more channel state information blocks use a channel time-domain coefficient or a frequency-domain coefficient;
 a feedback compression type identifier that indicates that the one or more channel state information blocks use a frequency-domain compressed coefficient matrix or a frequency-domain non-compressed coefficient matrix;
 a codebook information field that indicates a number of quantization bits corresponding to a preset quantization mode used for a value in the one or more channel state information blocks; and
 a measurement channel frequency-domain identifier corresponding to the feedback that indicates channel bandwidth or a frequency-domain resource block corresponding to the one or more channel state information blocks.

17. A channel state information receiving apparatus in wireless communications system, wherein the apparatus comprises:
 a processor; and
 a non-transitory computer readable storage medium storing a program for execution by the processor, the program including instructions to:
  receive a feedback frame, wherein the feedback frame is associated with a subset of transmit antennas of transmit antennas of an initiator and is generated in response to the responder receiving channel measurement signals sent on transmit antennas of an initiator, wherein the feedback frame comprises information indicating a subset of transmit antennas of the transmit antennas of the apparatus and one or more channel state information blocks that represent channel state information between the subset of transmit antennas of the initiator and one or more receive antennas of a responder, wherein the one or more channel state information blocks are associated with each antenna of the subset of transmit antennas and are associated with one or more signals of the channel measurement signals, and wherein the feedback frame excludes any channel state information block for one or more of the transmit antennas of the initiator on which a channel measurement signal is transmitted; and
  obtain, based on the information indicating the subset of transmit antennas of the initiator, the one or more channel state information blocks of a channel between the subset of transmit antennas of the initiator and the responder.

18. The apparatus according to claim 17, wherein the information indicating the subset of transmit antennas of the initiator is a transmit antenna mask field, and the transmit antenna mask field comprises a bitmap, wherein one bit in the bitmap indicating whether channel state information of one antenna of the transmit antennas of the initiator needs to be feedback.

19. The apparatus according to claim 18, wherein a value of the one bit being 1 indicates that channel state information of a corresponding transmit antenna needs to be feedback, and wherein the value of the one bit being 0 indicates that channel state information of a corresponding transmit antenna does not need to be feedback.

20. The apparatus according to claim 17, further comprises send a multiple-input multiple-output spatial configuration frame comprises one or more user mask fields which indicating the subset of transmit antennas of the initiator.

21. The method according to claim 1, further comprising:
 determining the subset of transmit antennas of the initiator based on one or more transmit antennas which send one or more channel measurement signal.

22. The apparatus according to claim 11, wherein the apparatus comprises:
 determine the subset of transmit antennas of the initiator based on one or more transmit antennas which send one or more channel measurement signal.

\* \* \* \* \*

UNITED STATES PATENT AND TRADEMARK OFFICE
CERTIFICATE OF CORRECTION

PATENT NO. : 11,728,864 B2
APPLICATION NO. : 16/925989
DATED : August 15, 2023
INVENTOR(S) : Yanchun Li It is certified that error appears in the above-identified patent and that said Letters Patent is hereby corrected as shown below:

In the Specification

In Column 17, Line 6, delete "soils" and insert -- sorts --.

In Column 24, Line 33, delete "1603," and insert -- 1602, --.

In Column 24, Line 34, delete "1602," and insert -- 1601, --.

In Column 24, Line 34, delete "1601." and insert -- 1603. --.

In Column 24, Line 36, delete "1602" and insert -- 1601 --.

In Column 24, Line 45, delete "1602" and insert -- 1601 --.

In Column 24, Line 52, delete "1602" and insert -- 1601 --.

In Column 24, Line 61, delete "1603" and insert -- 1602 --.

In Column 24, Line 63, delete "1601" and insert -- 1603 --.

In Column 24, Line 64, delete "1602" and insert -- 1601 --.

In Column 25, Line 1, delete "1601" and insert -- 1603 --.

In Column 25, Line 3, delete "1601" and insert -- 1603 --.

In Column 25, Line 7, delete "1601" and insert -- 1603 --.

In Column 25, Line 16, delete "1601" and insert -- 1603 --.

Signed and Sealed this
Seventh Day of November, 2023

Katherine Kelly Vidal
*Director of the United States Patent and Trademark Office*

In Column 25, Line 24, delete "1601" and insert -- 1603 --.

In Column 25, Line 32, delete "1602" and insert -- 1601 --.